(12) United States Patent
Freedman

(10) Patent No.: US 9,727,205 B2
(45) Date of Patent: Aug. 8, 2017

(54) USER INTERFACE WITH SCREEN SPANNING ICON MORPHING

(71) Applicant: Z124, George Town (KY)

(72) Inventor: Eric Freedman, Austin, TX (US)

(73) Assignee: Z124, George Town (KY)

( * ) Notice: Subject to any disclaimer, the term of this patent is extended or adjusted under 35 U.S.C. 154(b) by 351 days.

(21) Appl. No.: 14/476,542

(22) Filed: Sep. 3, 2014

(65) Prior Publication Data

US 2014/0380203 A1 Dec. 25, 2014

Related U.S. Application Data

(63) Continuation of application No. 12/948,686, filed on Nov. 17, 2010, now Pat. No. 8,842,080.

(60) Provisional application No. 61/389,000, filed on Oct. 1, 2010, provisional application No. 61/389,117, filed on Oct. 1, 2010, provisional application No. 61/389,087, filed on Oct. 1, 2010.

(51) Int. Cl.
*G06F 3/0481* (2013.01)
*G06F 3/0488* (2013.01)

(52) U.S. Cl.
CPC ........ *G06F 3/04817* (2013.01); *G06F 3/0488* (2013.01)

(58) Field of Classification Search
CPC ............................ G06F 3/04817; G06F 3/0488
See application file for complete search history.

(56) References Cited

U.S. PATENT DOCUMENTS

| | | |
|---|---|---|
| 5,396,630 A | 3/1995 | Banda et al. |
| 5,673,403 A | 9/1997 | Brown et al. |
| 5,764,984 A | 6/1998 | Loucks |
| 5,874,928 A | 2/1999 | Kou |
| 6,108,715 A | 8/2000 | Leach et al. |
| 6,157,959 A | 12/2000 | Bonham et al. |
| 6,178,503 B1 | 1/2001 | Madden et al. |
| 6,182,158 B1 | 1/2001 | Kougiouris et al. |
| 6,260,075 B1 | 7/2001 | Cabrero et al. |
| 6,477,585 B1 | 11/2002 | Cohen et al. |

(Continued)

FOREIGN PATENT DOCUMENTS

| | | |
|---|---|---|
| JP | 7-219903 | 8/1995 |
| JP | 08-115144 | 5/1996 |

(Continued)

OTHER PUBLICATIONS

U.S. Appl. No. 13/247,719, filed Sep. 28, 2011.

(Continued)

*Primary Examiner* — Viet Pham
(74) *Attorney, Agent, or Firm* — Sheridan Ross P.C.

(57) ABSTRACT

Methods and apparatus for indicating a status of an application that is displayable on one or more displays of a handheld computing device. An icon may be provided that indicates the status and/or potential statuses of the application (e.g., whether the application is expandable and/or expanded). The icon may be changeable between a first state and a second state depending on the status of the application. The change in the icon from the first state to the second state may be animated along with an animated change of the application between display states. As such, a user may observe the icon to determine the status of the application with respect to the one or more displays (e.g., whether the application is expandable, expanded, or expanding).

20 Claims, 8 Drawing Sheets

(56) References Cited

U.S. PATENT DOCUMENTS

| | | |
|---|---|---|
| 6,486,890 B1 | 11/2002 | Harada et al. |
| 6,507,336 B1 | 1/2003 | Lunsford |
| 6,573,913 B1 | 6/2003 | Butler et al. |
| 6,694,368 B1 | 2/2004 | An et al. |
| 6,826,703 B2 | 11/2004 | Kawano et al. |
| 6,917,963 B1 | 7/2005 | Hipp et al. |
| 6,927,908 B2 | 8/2005 | Stark |
| 6,961,941 B1 | 11/2005 | Nelson et al. |
| 6,970,173 B2 | 11/2005 | Ciolac |
| 7,007,240 B1 | 2/2006 | Anderson et al. |
| 7,069,519 B1 | 6/2006 | Okude et al. |
| 7,127,723 B2 | 10/2006 | Endo et al. |
| 7,176,943 B2 | 2/2007 | Meyers et al. |
| 7,284,203 B1 | 10/2007 | Meeks et al. |
| 7,453,465 B2 | 11/2008 | Schmieder et al. |
| 7,478,341 B2 | 1/2009 | Dove |
| 7,489,503 B2 | 2/2009 | Maatta |
| 7,565,535 B2 | 7/2009 | Roberts et al. |
| 7,681,134 B1 | 3/2010 | Grechishkin et al. |
| 7,705,799 B2 | 4/2010 | Niwa |
| 7,880,728 B2 | 2/2011 | de los Reyes et al. |
| 7,949,633 B1 | 5/2011 | Shaver et al. |
| 7,950,008 B2 | 5/2011 | Bhide et al. |
| 7,960,945 B1 | 6/2011 | Onorato et al. |
| 8,194,001 B2 | 6/2012 | Miller et al. |
| 8,397,245 B2 | 3/2013 | Filali-Adib et al. |
| 8,683,496 B2 | 3/2014 | Reeves et al. |
| 8,704,777 B2 | 4/2014 | Small et al. |
| 8,726,294 B2 | 5/2014 | Benedek et al. |
| 8,761,831 B2 | 6/2014 | Reeves |
| 8,819,705 B2 | 8/2014 | Reeves et al. |
| 8,842,080 B2 | 9/2014 | Freedman |
| 8,868,135 B2 | 10/2014 | Sirpal et al. |
| 8,898,443 B2 | 11/2014 | Reeves et al. |
| 2002/0010844 A1 | 1/2002 | Noel et al. |
| 2002/0130888 A1 | 9/2002 | Perry et al. |
| 2002/0157001 A1 | 10/2002 | Huang et al. |
| 2002/0158811 A1 | 10/2002 | Davis |
| 2003/0001848 A1 | 1/2003 | Doyle et al. |
| 2003/0020954 A1 | 1/2003 | Udom et al. |
| 2003/0079010 A1 | 4/2003 | Osborn |
| 2003/0079205 A1 | 4/2003 | Miyao et al. |
| 2003/0115443 A1 | 6/2003 | Cepulis et al. |
| 2003/0131143 A1 | 7/2003 | Myers |
| 2003/0174172 A1 | 9/2003 | Conrad et al. |
| 2003/0177285 A1 | 9/2003 | Hunt et al. |
| 2003/0179541 A1 | 9/2003 | Sullivan |
| 2003/0226116 A1 | 12/2003 | Kuwata et al. |
| 2004/0137855 A1 | 7/2004 | Wiley et al. |
| 2004/0141085 A1 | 7/2004 | Nickel et al. |
| 2004/0226023 A1 | 11/2004 | Tucker |
| 2005/0034017 A1 | 2/2005 | Airaud et al. |
| 2005/0083642 A1 | 4/2005 | Senpuku et al. |
| 2005/0193267 A1 | 9/2005 | Liu et al. |
| 2005/0216594 A1 | 9/2005 | O'Brien et al. |
| 2005/0237587 A1 | 10/2005 | Nakamura |
| 2005/0246505 A1 | 11/2005 | McKenney et al. |
| 2005/0248501 A1 | 11/2005 | Kim |
| 2006/0005187 A1 | 1/2006 | Neil |
| 2006/0010314 A1 | 1/2006 | Xu |
| 2006/0031572 A1 | 2/2006 | Feuerstein et al. |
| 2006/0107020 A1 | 5/2006 | Stillwell, Jr. et al. |
| 2006/0136828 A1 | 6/2006 | Asano |
| 2006/0139862 A1 | 6/2006 | Wang et al. |
| 2006/0183505 A1 | 8/2006 | Willrich |
| 2006/0187142 A1 | 8/2006 | Lesniak |
| 2006/0227806 A1 | 10/2006 | Tseng |
| 2006/0248404 A1 | 11/2006 | Lindsay et al. |
| 2007/0005661 A1 | 1/2007 | Yang |
| 2007/0014295 A1 | 1/2007 | Fernandes et al. |
| 2007/0022155 A1 | 1/2007 | Owens et al. |
| 2007/0033260 A1 | 2/2007 | Grouzdev et al. |
| 2007/0050751 A1 | 3/2007 | Husmann et al. |
| 2007/0067769 A1 | 3/2007 | Geisinger |
| 2007/0085759 A1 | 4/2007 | Lee et al. |
| 2007/0111750 A1 | 5/2007 | Stohr et al. |
| 2007/0136356 A1 | 6/2007 | Smith et al. |
| 2007/0156729 A1 | 7/2007 | Shaylor |
| 2007/0164923 A1 | 7/2007 | Kanai et al. |
| 2007/0182663 A1 | 8/2007 | Biech |
| 2007/0198760 A1 | 8/2007 | Han |
| 2007/0271522 A1 | 11/2007 | Son et al. |
| 2007/0285401 A1 | 12/2007 | Ohki et al. |
| 2007/0288941 A1 | 12/2007 | Dunshea et al. |
| 2008/0024388 A1 | 1/2008 | Bruce |
| 2008/0057910 A1 | 3/2008 | Thoresson et al. |
| 2008/0062625 A1 | 3/2008 | Batio |
| 2008/0071595 A1 | 3/2008 | Chang et al. |
| 2008/0082815 A1 | 4/2008 | Kawano et al. |
| 2008/0090525 A1 | 4/2008 | Joo |
| 2008/0119237 A1 | 5/2008 | Kim |
| 2008/0119731 A1 | 5/2008 | Becerra et al. |
| 2008/0126762 A1 | 5/2008 | Kelley et al. |
| 2008/0134061 A1 | 6/2008 | Banerjee et al. |
| 2008/0155103 A1 | 6/2008 | Bailey |
| 2008/0244599 A1 | 10/2008 | Hodson et al. |
| 2008/0282181 A1 | 11/2008 | Ferguson |
| 2008/0291283 A1 | 11/2008 | Achiwa et al. |
| 2008/0299951 A1 | 12/2008 | Karkanias et al. |
| 2009/0037649 A1 | 2/2009 | Xu |
| 2009/0055749 A1 | 2/2009 | Chatterjee et al. |
| 2009/0083829 A1 | 3/2009 | Peterson |
| 2009/0089569 A1 | 4/2009 | Baribault et al. |
| 2009/0100429 A1 | 4/2009 | Thoelke et al. |
| 2009/0109468 A1 | 4/2009 | Barclay et al. |
| 2009/0119580 A1 | 5/2009 | Rohrabaugh et al. |
| 2009/0138818 A1 | 5/2009 | Nemoto |
| 2009/0158299 A1 | 6/2009 | Carter |
| 2009/0164930 A1 | 6/2009 | Chen et al. |
| 2009/0176571 A1 | 7/2009 | Sternberg |
| 2009/0217071 A1 | 8/2009 | Huang et al. |
| 2009/0219254 A1 | 9/2009 | Lai et al. |
| 2009/0249247 A1 | 10/2009 | Tseng et al. |
| 2009/0249331 A1 | 10/2009 | Davis et al. |
| 2009/0257657 A1 | 10/2009 | Temmermans et al. |
| 2009/0278806 A1 | 11/2009 | Duarte et al. |
| 2009/0298546 A1 | 12/2009 | Kim et al. |
| 2009/0305743 A1 | 12/2009 | Gouesbet et al. |
| 2009/0313440 A1 | 12/2009 | Kim et al. |
| 2009/0322690 A1 | 12/2009 | Hiltunen et al. |
| 2009/0327560 A1 | 12/2009 | Yalovsky |
| 2010/0005396 A1 | 1/2010 | Nason et al. |
| 2010/0007603 A1 | 1/2010 | Kirkup |
| 2010/0013863 A1 | 1/2010 | Harris |
| 2010/0037166 A1 | 2/2010 | Chandrasekar et al. |
| 2010/0046026 A1 | 2/2010 | Heo |
| 2010/0049775 A1 | 2/2010 | Rajawat |
| 2010/0060549 A1 | 3/2010 | Tsern |
| 2010/0063994 A1 | 3/2010 | Cook et al. |
| 2010/0064228 A1 | 3/2010 | Tsern |
| 2010/0064244 A1 | 3/2010 | Kilpatrick et al. |
| 2010/0064536 A1 | 3/2010 | Caskey et al. |
| 2010/0066763 A1 | 3/2010 | Macdougall et al. |
| 2010/0079355 A1 | 4/2010 | Kilpatrick, II et al. |
| 2010/0085274 A1 | 4/2010 | Kilpatrick et al. |
| 2010/0085301 A1 | 4/2010 | Cohen et al. |
| 2010/0085382 A1 | 4/2010 | Lundqvist et al. |
| 2010/0097386 A1 | 4/2010 | Kim et al. |
| 2010/0107163 A1 | 4/2010 | Lee |
| 2010/0110480 A1 | 5/2010 | Satake |
| 2010/0122271 A1 | 5/2010 | Labour et al. |
| 2010/0149121 A1 | 6/2010 | Alexander et al. |
| 2010/0157518 A1 | 6/2010 | Ladouceur et al. |
| 2010/0164836 A1 | 7/2010 | Liberatore |
| 2010/0177019 A1 | 7/2010 | Jeong et al. |
| 2010/0177047 A1 | 7/2010 | Brenneman et al. |
| 2010/0182265 A1 | 7/2010 | Kim et al. |
| 2010/0207903 A1 | 8/2010 | Kim et al. |
| 2010/0211769 A1 | 8/2010 | Shankar et al. |
| 2010/0227650 A1 | 9/2010 | Kim et al. |
| 2010/0245256 A1 | 9/2010 | Estrada et al. |
| 2010/0246119 A1 | 9/2010 | Collopy et al. |
| 2010/0250975 A1 | 9/2010 | Gill et al. |
| 2010/0251233 A1 | 9/2010 | Majewski et al. |

(56) References Cited

U.S. PATENT DOCUMENTS

| | | |
|---|---|---|
| 2010/0319008 A1 | 12/2010 | Ho |
| 2010/0321275 A1 | 12/2010 | Hinckley et al. |
| 2011/0012858 A1 | 1/2011 | Brookes et al. |
| 2011/0016299 A1 | 1/2011 | Galicia et al. |
| 2011/0016301 A1 | 1/2011 | Galicia et al. |
| 2011/0018901 A1 | 1/2011 | Boorman et al. |
| 2011/0025625 A1 | 2/2011 | Hirako |
| 2011/0034214 A1 | 2/2011 | Hong et al. |
| 2011/0063192 A1 | 3/2011 | Miller et al. |
| 2011/0093691 A1 | 4/2011 | Galicia et al. |
| 2011/0093836 A1 | 4/2011 | Galicia et al. |
| 2011/0096014 A1 | 4/2011 | Fuyuno et al. |
| 2011/0102314 A1 | 5/2011 | Roux |
| 2011/0113329 A1 | 5/2011 | Pusateri |
| 2011/0115713 A1 | 5/2011 | Altman et al. |
| 2011/0115737 A1 | 5/2011 | Fuyuno et al. |
| 2011/0126216 A1 | 5/2011 | Galicia et al. |
| 2011/0167492 A1 | 7/2011 | Ghosh et al. |
| 2011/0193806 A1 | 8/2011 | Kim et al. |
| 2011/0209102 A1 | 8/2011 | Hinckley et al. |
| 2011/0210922 A1 | 9/2011 | Griffin |
| 2011/0216064 A1 | 9/2011 | Dahl et al. |
| 2011/0225538 A1 | 9/2011 | Oyagi et al. |
| 2011/0239142 A1 | 9/2011 | Steeves et al. |
| 2011/0246904 A1 | 10/2011 | Pinto et al. |
| 2011/0260997 A1 | 10/2011 | Ozaki |
| 2011/0267478 A1 | 11/2011 | Jacobs |
| 2011/0273464 A1 | 11/2011 | Brunner et al. |
| 2011/0273475 A1 | 11/2011 | Herz et al. |
| 2011/0289444 A1 | 11/2011 | Winsky |
| 2011/0291964 A1 | 12/2011 | Chambers et al. |
| 2011/0312349 A1 | 12/2011 | Forutanpour |
| 2012/0005602 A1 | 1/2012 | Anttila et al. |
| 2012/0005691 A1 | 1/2012 | Wong et al. |
| 2012/0026069 A1 | 2/2012 | Ohsaki |
| 2012/0060089 A1 | 3/2012 | Heo et al. |
| 2012/0066581 A1 | 3/2012 | Spalink |
| 2012/0076197 A1 | 3/2012 | Byford et al. |
| 2012/0081353 A1 | 4/2012 | Yusupov et al. |
| 2012/0081354 A1 | 4/2012 | Yusupov et al. |
| 2012/0081380 A1 | 4/2012 | Reeves et al. |
| 2012/0081383 A1 | 4/2012 | Reeves et al. |
| 2012/0081396 A1 | 4/2012 | Yusupov et al. |
| 2012/0084480 A1 | 4/2012 | Reeves et al. |
| 2012/0084481 A1 | 4/2012 | Reeves et al. |
| 2012/0084675 A1 | 4/2012 | Sirpal et al. |
| 2012/0084697 A1 | 4/2012 | Reeves |
| 2012/0084791 A1 | 4/2012 | Benedek et al. |
| 2012/0084793 A1 | 4/2012 | Reeves et al. |
| 2012/0086716 A1 | 4/2012 | Reeves et al. |
| 2012/0086717 A1 | 4/2012 | Liu |
| 2012/0089906 A1 | 4/2012 | Reeves et al. |
| 2012/0172088 A1 | 7/2012 | Kirch et al. |
| 2012/0176413 A1 | 7/2012 | Kulik et al. |
| 2012/0188185 A1 | 7/2012 | Cassar |
| 2012/0278747 A1 | 11/2012 | Abraham et al. |
| 2012/0278750 A1 | 11/2012 | Abraham et al. |
| 2013/0019183 A1 | 1/2013 | Reeves et al. |
| 2013/0021262 A1 | 1/2013 | Chen |
| 2013/0024778 A1 | 1/2013 | Reeves et al. |
| 2013/0024812 A1 | 1/2013 | Reeves et al. |
| 2013/0076672 A1 | 3/2013 | Sirpal et al. |
| 2013/0076677 A1 | 3/2013 | Kretz |
| 2013/0076678 A1 | 3/2013 | Kretz |
| 2013/0076679 A1 | 3/2013 | Kretz |
| 2013/0076683 A1 | 3/2013 | Reeves |
| 2013/0080945 A1 | 3/2013 | Reeves |
| 2013/0088411 A1 | 4/2013 | Reeves et al. |
| 2013/0167159 A1 | 6/2013 | Ricci et al. |
| 2013/0219162 A1 | 8/2013 | Reeves et al. |
| 2013/0312106 A1 | 11/2013 | Reeves et al. |
| 2014/0059566 A1 | 2/2014 | Benedek |

FOREIGN PATENT DOCUMENTS

| | | |
|---|---|---|
| JP | 2008-225546 | 9/2008 |
| KR | 1020020092969 | 12/2002 |
| KR | 100578592 | 5/2006 |
| KR | 1020060081997 | 7/2006 |
| KR | 100616157 | 8/2006 |
| KR | 100883208 | 2/2009 |
| KR | 1020100043434 | 4/2010 |
| WO | WO 2006/075859 | 7/2006 |
| WO | WO 2008/132924 | 11/2008 |
| WO | WO 2012/044510 | 4/2012 |
| WO | WO 2012/044518 | 4/2012 |
| WO | WO 2012/044645 | 4/2012 |
| WO | WO 2012/044738 | 4/2012 |
| WO | WO 2012/044872 | 4/2012 |

OTHER PUBLICATIONS

U.S. Appl. No. 14/498,330, filed Sep. 26, 2014.
U.S. Appl. No. 13/624,565, filed Sep. 21, 2012.
U.S. Appl. No. 13/628,380, filed Sep. 27, 2012.
U.S. Appl. No. 13/628,157, filed Sep. 27, 2012.
U.S. Appl. No. 13/628,170, filed Sep. 27, 2012.
U.S. Appl. No. 13/628,234, filed Sep. 27, 2012.
U.S. Appl. No. 13/629,415, filed Sep. 27, 2012.
U.S. Appl. No. 13/628,949, filed Sep. 27, 2012.
U.S. Appl. No. 13/399,901, filed Feb. 17, 2012.
U.S. Appl. No. 13/399,929, filed Feb. 17, 2012.
U.S. Appl. No. 13/399,936, filed Feb. 17, 2012.
U.S. Appl. No. 12/948,701, filed Nov. 17, 2010.
U.S. Appl. No. 13/246,665, filed Sep. 27, 2011.
U.S. Appl. No. 13/217,099, filed Aug. 24, 2011.
U.S. Appl. No. 14/068,662, filed Oct. 31, 2013.
U.S. Appl. No. 14/539,016, filed Nov. 12, 2014.
U.S. Appl. No. 13/251,427, filed Oct. 3, 2011.
U.S. Appl. No. 13/250,764, filed Sep. 30, 2011.
U.S. Appl. No. 13/217,130, filed Aug. 24, 2011.
U.S. Appl. No. 13/247,170, filed Sep. 28, 2011.
U.S. Appl. No. 13/246,671, filed Sep. 27, 2011.
U.S. Appl. No. 13/246,118, filed Sep. 27, 2011.
U.S. Appl. No. 13/246,128, filed Sep. 27, 2011.
U.S. Appl. No. 13/246,133, filed Sep. 27, 2011.
U.S. Appl. No. 13/246,675, filed Sep. 27, 2011.
U.S. Appl. No. 13/217,121, filed Aug. 24, 2011.
U.S. Appl. No. 14/498,330, filed Sep. 29, 2014, Sirpal et al.
U.S. Appl. No. 14/539,016, filed Nov. 12, 2014, Reeves et al.
Google images, accessed Apr. 18, 2011, 6 pages.
"Apple iPod and iPhone dock Connector Pinout," AllPinouts, Sep. 27, 2010, 3 pages [www.allpinouts.org/index/php/Apple_iPod,_iPad_and_iPhone_dock].
Google Transliteration IME website, 2010, available at www.google.com/ime/transliteration/help.html#features, 8 pages.
"How to Install Ubuntu on Your Nexus One/Android!" NexusOneHacks.net, Jul. 6, 2010, 9 pages [nexusonehacks.net/nexus-one-hacks/how-to-install-ubuntu-on-your-android].
InputKing Online Input System, 2011, available at www.inputking.com, 2 pages.
"Lapdock™ for Motorola ATRIX," at http://www.motorola.com/Consumers/US-EN/Consumer-Product-and-Services/Mobile . . . , accessed Apr. 18, 2011, 1 page.
"Motorola ATRIX 4G Laptop Dock Review," at http://www.phonearena.com/reviews/Motorola-ATRIX-4G-Laptop-Dock-Review_id2667, Mar. 2, 2011, 6 pages.
Burns, C., "Motorola ATRIX 4G Laptop Dock Review," at http://androidcommunity.com/motorola-atrix-4g-laptop-dock-review-20110220/, Feb. 20, 2011, 5 pages.
Catacchio, Chad, "This smartphone has two huge screens . . . that rotate," The Next Web at http://thenextweb.com/asia/2010/10/07/this-smartphone-has-two-huge-screens-that-rotate/, Jul. 21, 2011, 2 pages.

(56) References Cited

OTHER PUBLICATIONS

Dutko, "Domo Arigato Mr Androidato—An Introduction to the New Google Mobile Linux Framework, Android," Linux Journal, Mar. 2008, vol. 2008, Iss. 167, 9 pages.
Harman03, "Kyocera Echo Dual-screen Android Phone," posted 4 weeks from Apr. 18, 2011, 3 pages.
Kilpatrick et al., "Securing the X Window System with SELinux," NAI Labs Report No. 03-006, 2003, 33 pages.
Haselton, "Celio Announces Redfly Smart Phone Dock, Software for Windows PCs," LAPTOP Magazine, Jan. 8, 2009, [retrieved on Feb. 11, 2014], 4 pages. Retrieved from: blog.laptopmag.com/redfly-launches-smartphone-dock-software-for-windows-pcs.
McDermott "Porting Android to a new device," Embedded Software, Jan. 28, 2010, 12 pages [retrieved from: http://yidonghan.wordpress.com/2010/01/28/porting-android-to-a-new-device/].
Mikeclay, "Launch Multiple Programs at Once Using Simple Batch File," Feb. 5, 2009 available at www.web.archive.org/web/20090205134920/http://www.windowsreference.com/windows-2000/launch-multiple-programs-at-once-using-simple-batch-file/, 5 pages.
Rebecka & Zingo, "Share memory using ashmem and binder in the android framework," Android Blog, Mar. 22, 2010, 14 pages [retrieved from: http://www.androidenea.com/2010/03/share-memory-using-ashmem-and-binder-in.html].
Sakhr Software—Arabic Optical Character Recognition, Jul. 15, 2011, available at www.sakhr.com/ocr.aspx, 1 page.
Stallman "GNU Operating System: Android and Users' Freedom," Sep. 2, 2013, 4 pages [gnu.org/philosophy/android-and-users-freedom.html].
Stein, S., "How does the Motorola Atrix 4G Lapdock compare with a laptop?" Crave—CNET, at http://news.cnet.com/8301-17938_105-20031251-1.html, Feb. 9, 2011, 7 pages.
Sud, et al., "Dynamic Migration of Computation Through Virtualization of the Mobile Platform," Mobile Networks and Applications, 2012, (published online Feb. 22, 2011), vol. 17, Iss. 2, pp. 206-215.
Website entitled, "Kyocera Echo," at www.echobykyocera.com/, 2011, 6 pages.
Website entitled, "Sony Tablet," at www.store.sony.com/webapp/wcs/stores/servlet/CategoryDisplay?catalogId=10551&storeId=10151&langId=-1&categoryId=8198552921644795521, 2011, 3 pages.
Wikipedia, "Balloon help," Jul. 18, 2011, available at www.en.wikipedia.org/wiki/Balloon_help, 3 pages.
Wikipedia, "Google Pinyin," Aug. 27, 2011 available at www.en.wikipedia.org/wiki/Google_Pinyin, 3 pages.
Wikipedia, "Mouseover," Sep. 29, 2011, available at www.en.wikipedia.org/wiki/Mouseover, 2 pages.
Wikipedia, "Predictive text," Aug. 7, 2011, available at www.en.wikipedia.org/wiki/Predictive_test, 6 pages.
Wikipedia, "Sogou Pinyin," Jul. 23, 2011 available at www.en.wikipedia.org/wiki/Sogou_Pinyin, 3 pages.
Wikipedia, "Status bar," Sep. 8, 2011, available at www.en.wikipedia.org/wiki/Status_bar, 3 pages.
Wikipedia, "Tooltip," Sep. 17, 2011, available at www.en.wikipedia.org/wiki/Tooltip, 2 pages.
International Search Report for International (PCT) Patent Application No. PCT/US2012/046798, mailed Feb. 20, 2013 3 pages.
International Preliminary Report on Patentability for International (PCT) Patent Application No. PCT/US2012/046798, mailed Jan. 23, 2014 6 pages.
International Search Report and Written Opinion for International Patent Application No. PCT/US2012/046800, mailed Feb. 20, 2013, 9 pages.
International Preliminary Report on Patentability for International (PCT) Patent Application No. PCT/US2012/046800, mailed Jan. 23, 2014 6 pages.
International Search Report and Written Opinion for International Patent Application No. PCT/US2012/046802, mailed Feb. 20, 2013, 9 pages.
International Preliminary Report on Patentability for International Patent Application No. PCT/US2012/046802, mailed Jan. 23, 2014, 6 pages.
International Search Report for International Patent Application No. PCT/US2011/056149, mailed Apr. 24, 2012, 5 pages.
Written Opinion for International Patent Application No. PCT/US2011/056149, mailed Apr. 24, 2012, 4 pages.
International Preliminary Report on Patentability for International Patent Application No. PCT/US2011/056149, mailed Apr. 25, 2013, 6 pages.
International Search Report for International Patent Application No. PCT/US11/52822, mailed Apr. 27, 2012, 5 pages.
International Preliminary Report on Patentability for International (PCT) Patent Application No. PCT/US2011/052822, mailed Apr. 11, 2013, 7 pages.
International Search Report for International Patent Application No. PCT/US11/52598, mailed Mar. 27, 2012, 3 pages.
International Preliminary Report on Patentability for International (PCT) Patent Application No. PCT/US2011/052598, mailed Apr. 11, 2013 9 pages.
International Search Report for International Patent Application No. PCT/US11/53835, mailed Apr. 30, 2012, 5 pages.
Written Opinion for International Patent Application No. PCT/US11/53835, mailed Apr. 30, 2012, 4 pages.
International Preliminary Report on Patentability for International (PCT) Patent Application No. PCT/US2011/053835, mailed Apr. 11, 2013 6 pages.
Official Action for Mexican Patent Application No. MX/a/2013/003515, mailed Jun. 12, 2014, 3 pages (includes English summary).
International Search Report for International Patent Application No. PCT/US2011/053130, mailed Apr. 24, 2012, 5 pages.
Written Opinion for International Patent Application No. PCT/US2011/053130, mailed Apr. 24, 2012, 4 pages.
International Preliminary Report on Patentability for International Patent Application No. PCT/US2011/053130, mailed Apr. 11, 2013, 6 pages.
International Search Report for International Patent Application No. PCT/US2011/053826, mailed Apr. 27, 2012, 5 pages.
Written Opinion for International Patent Application No. PCT/US2011/053826, mailed Apr. 27, 2012, 4 pages.
International Preliminary Report on Patentability for International Patent Application No. PCT/US2011/053826, mailed Apr. 11, 2013, 6 pages.
International Search Report for International Patent Application No. PCT/US2011/052988, mailed May 3, 2012, 5 pages.
Written Opinion for International Patent Application No. PCT/US2011/052988, mailed May 3, 2012, 4 pages.
International Preliminary Report on Patentability for International Patent Application No. PCT/US2011/052988, mailed Apr. 11, 2013, 6 pages.
Extended Search Report for European Patent Application No. 11829766.2, dated Jan. 8, 2014 11 pages.
International Search Report for International Patent Application No. PCT/US2011/054605, mailed Apr. 30, 2012, 5 pages.
Written Opinion for International Patent Application No. PCT/US2011/054605, mailed Apr. 30, 2012, 5 pages.
International Preliminary Report on Patentability for International Patent Application No. PCT/US2011/054605, mailed Apr. 11, 2013, 7 pages.
International Search Report for International Patent Application No. PCT/US2011/053909, mailed Apr. 30, 2012, 5 pages.
Written Opinion for International Patent Application No. PCT/US2011/053909, mailed Apr. 30, 2012, 4 pages.
International Preliminary Report on Patentability for International Patent Application No. PCT/US2011/053909, mailed Apr. 11, 2013, 6 pages.
International Search Report for International Patent Application No. PCT/US2011/054623, mailed Apr. 27, 2012, 5 pages.
Written Opinion for International Patent Application No. PCT/US2011/054623, mailed Apr. 27, 2012, 4 pages.
International Preliminary Report on Patentability for International Patent Application No. PCT/US2011/054623, mailed Apr. 11, 2013, 6 pages.

(56) References Cited

OTHER PUBLICATIONS

International Search Report for International Patent Application No. PCT/US2011/053037, mailed Mar. 20, 2012, 5 pages.
Written Opinion for International Patent Application No. PCT/US2011/053037, mailed Mar. 20, 2012, 6 pages.
International Preliminary Report on Patentability for International Patent Application No. PCT/US2011/053037, mailed Apr. 11, 2013, 8 pages.
International Search Report for International Patent Application No. PCT/US2011/053923, mailed Apr. 30, 2012, 5 pages.
Written Opinion for International Patent Application No. PCT/US2011/053923, mailed Apr. 30, 2012, 4 pages.
International Preliminary Report on Patentability for International Patent Application No. PCT/US2011/053923, mailed Apr. 11, 2013, 6 pages.
International Search Report for International Patent Application No. PCT/US2011/054017, mailed Apr. 24, 2012, 5 pages.
Written Opinion for International Patent Application No. PCT/US2011/054017, mailed Apr. 24, 2012, 4 pages.
International Preliminary Report on Patentability for International Patent Application No. PCT/US2011/054017, mailed Apr. 11, 2013, 6 pages.
International Search Report for International Patent Application No. PCT/US11/54105, mailed Apr. 30, 2012, 3 pages.
International Preliminary Report on Patentability for International (PCT) Patent Application No. PCT/US2011/054105, mailed Apr. 11, 2013 5 pages.
International Search Report for International Patent Application No. PCT/US11/53585, mailed May 4, 2012, 3 pages.
International Preliminary Report on Patentability for International (PCT) Patent Application No. PCT/US2011/053585, mailed Apr. 11, 2013, 6 pages.
International Search Report for International Patent Application No. PCT/US2011/053665, mailed Apr. 30, 2012, 5 pages.
Written Opinion for International Patent Application No. PCT/US2011/053665, mailed Apr. 30, 2012, 4 pages.
International Preliminary Report on Patentability for International Patent Application No. PCT/US2011/053665, mailed Apr. 11, 2013, 6 pages.
International Search Report for International Patent Application No. PCT/US2011/053691, mailed May 4, 2012, 5 pages.
Written Opinion for International Patent Application No. PCT/US2011/053691, mailed May 4, 2012, 4 pages.
International Preliminary Report on Patentability for International Patent Application No. PCT/US2011/053691, mailed Apr. 11, 2013, 6 pages.
International Search Report for International Patent Application No. PCT/US2011/054019, mailed Apr. 10, 2012, 5 pages.
Written Opinion for International Patent Application No. PCT/US2011/054019, mailed Apr. 10, 2012, 4 pages.
International Preliminary Report on Patentability for International Patent Application No. PCT/US2011/054019, mailed Apr. 11, 2013, 6 pages.
International Search Report for International Patent Application No. PCT/US2011/053127, mailed Apr. 24, 2012, 5 pages.
Written Opinion for International Patent Application No. PCT/US2011/053127, mailed Apr. 24, 2012, 4 pages.
International Preliminary Report on Patentability for International Patent Application No. PCT/US2011/053127, mailed Apr. 11, 2013, 6 pages.
Official Action for U.S. Appl. No. 13/247,719, mailed Mar. 29, 2013 16 pages.
Official Action for U.S. Appl. No. 13/247,719, mailed Aug. 16, 2013 20 pages.
Official Action for U.S. Appl. No. 13/484,951, mailed Aug. 17, 2012, 13 pages.
Official Action for U.S. Appl. No. 13/484,951, mailed Mar. 11, 2013 11 pages.
Official Action for U.S. Appl. No. 13/484,951, mailed Jul. 25, 2013 12 pages.
Official Action for U.S. Appl. No. 13/484,951, mailed Jan. 30, 2014 12 pages.
Notice of Allowance for U.S. Appl. No. 13/484,951, mailed May 12, 2014 7 pages.
Official Action for U.S. Appl. No. 13/624,565, mailed Jun. 5, 2014 30 pages.
Official Action for U.S. Appl. No. 13/628,380, mailed Jun. 5, 2014 16 pages.
Official Action for U.S. Appl. No. 13/629,415, mailed Apr. 25, 2014 16 pages.
Official Action for U.S. Appl. No. 13/399,901, mailed Aug. 2, 2013 17 pages.
Final Action for U.S. Appl. No. 13/399,901, mailed Dec. 26, 2013 20 pages.
Official Action for U.S. Appl. No. 13/399,901, mailed May 1, 2014 17 pages.
Official Action for U.S. Appl. No. 13/399,929, mailed Dec. 3, 2013 21 pages.
Official Action for U.S. Appl. No. 13/399,929, mailed Jun. 18, 2014 35 pages.
Official Action for U.S. Appl. No. 13/399,936, mailed Sep. 10, 2013 23 pages.
Official Action for U.S. Appl. No. 13/399,936, mailed Feb. 20, 2014 27 pages.
Official Action for U.S. Appl. No. 12/905,920 mailed Dec. 7, 2012, 13 pages.
Official Action for U.S. Appl. No. 12/905,920 mailed Mar. 15, 2012, 12 pages.
Official Action for U.S. Appl. No. 12/905,920 mailed Jul. 3, 2012, 14 pages.
Official Action for U.S. Appl. No. 12/905,920 mailed Apr. 25, 2013, 16 pages.
Official Action for U.S. Appl. No. 12/905,920, mailed Sep. 30, 2013 20 pages.
Notice of Allowance for U.S. Appl. No. 12/905,920, mailed Feb. 27, 2014 13 pages.
Official Action for U.S. Appl. No. 12/948,686, mailed Jul. 26, 2013 11 pages.
Official Action for U.S. Appl. No. 12/948,686, mailed Jan. 29, 2014 13 pages.
Notice of Allowance for U.S. Appl. No. 12/948,686, mailed May 9, 2014 7 pages.
Official Action for U.S. Appl. No. 12/948,701, mailed Nov. 16, 2012, 16 pages.
Official Action for U.S. Appl. No. 12/948,701, mailed Jun. 7, 2013 16 pages.
Official Action for U.S. Appl. No. 12/948,701, mailed Jun. 3, 2014 19 pages.
Official Action for U.S. Appl. No. 13/246,665, mailed Apr. 24, 2013 30 pages.
Official Action for U.S. Appl. No. 13/246,665, mailed Aug. 28, 2013 33 pages.
Official Action for U.S. Appl. No. 13/246,665, mailed Feb. 27, 2014 38 pages.
Official Action for U.S. Appl. No. 13/246,665, mailed Jun. 12, 2014 39 pages.
Official Action for U.S. Appl. No. 13/217,099 mailed Apr. 10, 2013, 53 pages.
Final Action for U.S. Appl. No. 13/217,099, mailed Oct. 9, 2013 74 pages.
Official Action for U.S. Appl. No. 13/217,099, mailed May 29, 2014 73 pages.
Official Action for U.S. Appl. No. 13/247,885 mailed Mar. 19, 2013, 19 pages.
Notice of Allowance for U.S. Appl. No. 13/247,885, mailed Aug. 29, 2013 12 pages.
Notice of Allowance for U.S. Appl. No. 13/247,885, mailed Jan. 9, 2014 8 pages.
Official Action for U.S. Appl. No. 14/068,662, mailed Jul. 28, 2014 26 pages.
Official Action for U.S. Appl. No. 13/217,108, mailed Oct. 11, 2013 13 pages.

(56) References Cited

OTHER PUBLICATIONS

Official Action for U.S. Appl. No. 13/217,108 mailed Feb. 25, 2014, 22 pages.
Official Action for U.S. Appl. No. 13/217,108, mailed Jun. 20, 2014 18 pages.
Notice of Allowance for U.S. Appl. No. 13/217,108, mailed Jul. 11, 2014 7 pages.
Offical Action for U.S. Appl. No. 13/251,427 mailed Feb. 15, 2013, 18 pages.
Final Action for U.S. Appl. No. 13/251,427, mailed Oct. 21, 2013 17 pages.
Official Action for U.S. Appl. No. 13/251,427, mailed May 23, 2014 15 pages.
Official Action for U.S. Appl. No. 13/247,166 mailed Mar. 21, 2013, 4 pages Restriction Requirement.
Official Action for U.S. Appl. No. 13/247,166, mailed Jul. 2, 2013 12 pages.
Notice of Allowance for U.S. Appl. No. 13/247,166, mailed Nov. 4, 2013 14 pages.
Official Action for U.S. Appl. No. 13/250,764, mailed Dec. 11, 2013 23 pages.
Official Action for U.S. Appl. No. 13/250,764, mailed Jul. 1, 2014 26 pages.
Official Action for U.S. Appl. No. 13/217,130 mailed Mar. 15, 2013, 12 pages.
Official Action for U.S. Appl. No. 13/217,130, mailed Sep. 16, 2013 12 pages.
Official Action for U.S. Appl. No. 13/217,130, mailed Mar. 20, 2014 18 pages.
Official Action for U.S. Appl. No. 13/247,170 mailed Apr. 11, 2013, 36 pages.
Official Action for U.S. Appl. No. 13/247,170, mailed Aug. 5, 2013 34 pages.
Official Action for U.S. Appl. No. 13/247,170, mailed Dec. 11, 2013 47 pages.
Official Action for U.S. Appl. No. 13/247,170, mailed Jun. 5, 2014 58 pages.
Official Action for U.S. Appl. No. 13/246,669 mailed Jan. 8, 2013, 14 pages.
Official Action for U.S. Appl. No. 13/246,699, mailed Jul. 12, 2013 18 pages.
Notice of Allowance for U.S. Appl. No. 13/246,669, mailed Sep. 11, 2013 16 pages.
Notice of Allowance for U.S. Appl. No. 13/246,669, mailed Apr. 11, 2014 11 pages.
Official Action for U.S. Appl. No. 13/246,671, mailed Mar. 27, 2013 34 pages.
Official Action for U.S. Appl. No. 13/246,671, mailed Jul. 15, 2013.
Official Action for U.S. Appl. No. 13/246,671, mailed Nov. 20, 2013 50 pages.
Official Action for U.S. Appl. No. 13/246,671, mailed Jun. 5, 2014 60 pages.
Official Action for U.S. Appl. No. 13/246,128 mailed May 10, 2013, 40 pages.
Official Action for U.S. Appl. No. 13/246,128, mailed Aug. 23, 2013 46 pages.
Official Action for U.S. Appl. No. 13/246,128, mailed Dec. 26, 2013 43 pages.
Official Action for U.S. Appl. No. 13/246,128, mailed Jun. 13, 2014 50 pages.
Official Action for U.S. Appl. No. 13/246,133 mailed Apr. 16, 2013, 25 pages.
Official Action for U.S. Appl. No. 13/246,133, mailed Aug. 23, 2013 32 pages.
Official Action for U.S. Appl. No. 13/246,133, mailed Jan. 15, 2014 37 pages.
Official Action for U.S. Appl. No. 13/246,133, mailed Jun. 13, 2014 44 pages.
Official Action for U.S. Appl. No. 13/246,675 mailed May 1, 2013, 27 pages.
Official Action for U.S. Appl. No. 13/246,675, mailed Sep. 27, 2013 32 pages.
Official Action for U.S. Appl. No. 13/246,675, mailed Mar. 7, 2014 34 pages.
Notice of Allowance for U.S. Appl. No. 13/246,675, mailed Jul. 29, 2014 9 pages.
Official Action for U.S. Appl. No. 13/217,121 mailed Mar. 6, 2013, 11 pages.
Official Action for U.S. Appl. No. 13/217,121, mailed Aug. 1, 2013 11 pages.
Official Action for U.S. Appl. No. 13/217,121, mailed Feb. 10, 2014 12 pages.
Official Action for U.S. Appl. No. 13/217,121, mailed Jun. 12, 2014 13 pages.
Official Action for European Patent Application No. 11829880.1, mailed Aug. 13, 2014, 5 pages.
European Extended Search Report for European Patent Application No. 11829880.1, mailed Dec. 5, 2014, 10 pages.
Official Action for U.S. Appl. No. 13/247,719, mailed Aug. 29, 2014 21 pages.
Notice of Allowance for U.S. Appl. No. 14/498,330, mailed Oct. 27, 2014 8 pages.
Official Action for U.S. Appl. No. 13/624,565, mailed Oct. 14, 2014 36 pages.
Official Action for U.S. Appl. No. 13/628,380, mailed Sep. 12, 2014 16 pages.
Official Action for U.S. Appl. No. 13/628,157, mailed Aug. 14, 2014 7 pages.
Official Action for U.S. Appl. No. 13/628,234, mailed Sep. 12, 2014 9 pages.
Official Action for U.S. Appl. No. 13/628,949, mailed Oct. 9, 2014 11 pages.
Official Action for U.S. Appl. No. 13/399,901, mailed Oct. 29, 2014 23 pages.
Notice of Allowance for U.S. Appl. No. 13/399,936, mailed Sep. 15, 2014 11 pages.
Official Action for U.S. Appl. No. 13/217,130, mailed Aug. 5, 2014 19 pages.
Notice of Allowance for U.S. Appl. No. 13/247,170, mailed Sep. 23, 2014 11 pages.
Notice of Allowance for U.S. Appl. No. 13/246,671, mailed Sep. 25, 2014 9 pages.
Official Action for U.S. Appl. No. 13/246,118, mailed Oct. 8, 2014 10 pages.
Official Action for U.S. Appl. No. 13,628,170, mailed Nov. 3, 2014 9 pages.
Official Action for U.S. Appl. No. 13/629,415, mailed Dec. 3, 2014 22 pages.
Official Action for U.S. Appl. No. 13/217,099, mailed Dec. 1, 2014 82 pages.
Official Action for U.S. Appl. No. 13/251,427, mailed Dec. 8, 2014 17 pages.
Notice of Allowance for U.S. Appl. No. 13/250,764, mailed Dec. 4, 2014 8 pages.
Notice of Allowance for U.S. Appl. No. 13/217,130, mailed Dec. 3, 2014 5 pages.
Notice of Allowance for Mexican Patent Application No. MX/a/2013/003515, mailed Nov. 5, 2014, 1 page.
Notice of Allowance for Mexican Patent Application No. MX/a/2013/003427, mailed Nov. 26, 2014, 1 page.
Official Action for U.S. Appl. No. 13/624,565, mailed Jan. 8, 2015 47 pages.
Official Action for U.S. Appl. No. 13/628,380, mailed Jan. 2, 2015 18 pages.
Official Action for U.S. Appl. No. 12/948,701, mailed Dec. 15, 2014 19 pages.
Notice of Allowance for U.S. Appl. No. 13/246,665, mailed Jan. 13, 2015 9 pages.
Notice of Allowance for U.S. Appl. No. 14/068,662, mailed Jan. 12, 2015 15 pages.
Notice of Allowance for U.S. Appl. No. 13/246,133, mailed Jan. 21, 2015 10 pages.

(56) References Cited

OTHER PUBLICATIONS

Official Action for U.S. Appl. No. 13/217,121, mailed Dec. 18, 2014 15 pages.

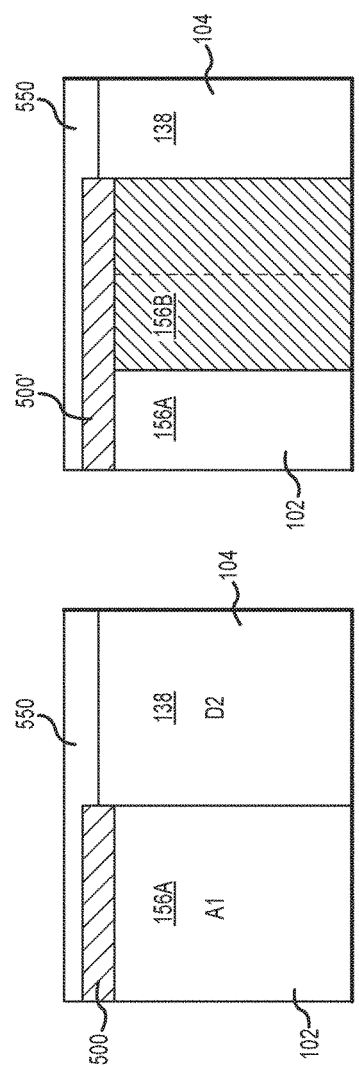
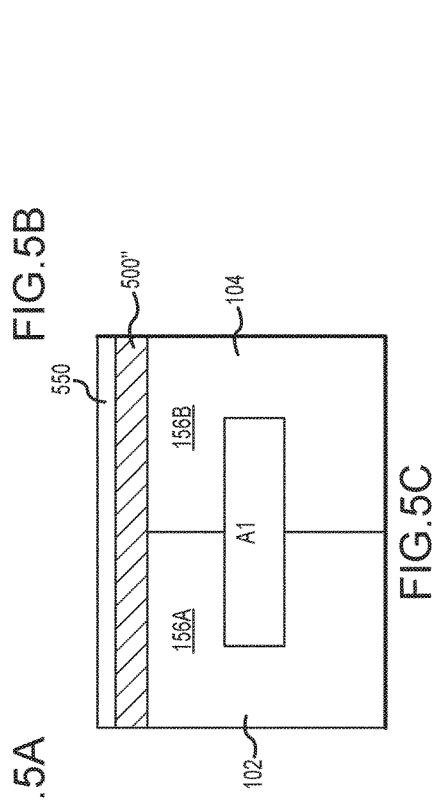
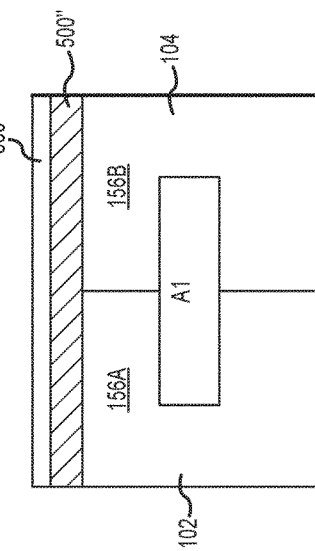

USER INTERFACE WITH SCREEN SPANNING ICON MORPHING

RELATED APPLICATIONS

This application is a continuation of and claims priority to U.S. patent application Ser. No. 12/948,686, filed on Nov. 17, 2010, of the same title, which claims priority to U.S. Provisional Application Ser. No. 61/389,000, filed on Oct. 1, 2010, entitled "DUAL DISPLAY WINDOWING SYSTEM"; Provisional Application Ser. No. 61/389,117, filed on Oct. 1, 2010, entitled "MULTI-OPERATING SYSTEM PORTABLE DOCKING DEVICE"; and Provisional Application Ser. No. 61/389,087, filed on Oct. 1, 2010, entitled "TABLET COMPUTING USER INTERFACE". Each and every part of the foregoing applications is hereby incorporated by reference in their entirety.

BACKGROUND

As the computing and communication functions of handheld computing devices become more powerful, the user interface and display elements of such devices have evolved by attempting to adapt user interface regimes developed for personal computers for use with handheld computing devices. However, this attempt to adapt prior user interface regimes has been met with various hurdles.

For instance, the majority of current handheld computing devices make use of a physical keypad for user interface. Many different implementations of physical keypads exist that vary in orientation and relationship to the device screen. However, in every case the physical keypads take up a certain percentage of the physical space of the device and increase the weight of the device. In addition to the disadvantages of size and weight, physical keypads are not configurable in the same manner as a touch screen based user interface. While certain limited forms of physical keypads currently have, on the keys themselves, configurable displays, such as eInk or OLED surfaces, to allow for reconfiguration of the keys, even in these cases, the physical layout of keys is not modifiable. Rather, only the values associated with the physical keys on the keypad may be changed.

Other methods may provide increased user configurability of physical keypads. These methods may include stickers and/or labels that can be added to keys to reference modified functions or plastic overlays on top of the keypad denoting different functional suites. For instance, the ZBoard keyboard, meant for laptop or desktop computer use, incorporates a dual layered physical keyboard which separates the keys and their layout from the connections which send signals to the machine. As such, different physical keyboard inserts for different applications can be inserted into a holder allowing full configurability such that the orientation and layout of the keys in addition to their denotation of function is configurable. This model could be extended to handheld computing devices; however, the rate at which such a modular keypad can change functions is much slower than a touch screen user interface. Furthermore, for each potential functional suite, an additional physical key layout must be carried by the user, greatly increasing the overall physical size and weight of such implementations. One advantage of a physical keypad for handheld computing devices is that the user input space is extended beyond the user display space such that none of the keys themselves, the housing of the keys, a user's fingers, or a pointing device obscure any screen space during user interface activities.

A substantial number of handheld computing devices make use of a small touch screen display to deliver display information to the user and to receive inputs from the user. In this case, while the configurability of the device may be greatly increased and a wide variety of user interface options may be available to the user, this flexibility comes at a price. Namely, such arrangements require shared screen space between the display and the user interface. While this issue is shared with other types of touch screen display/user interface technology, the small form factor of handheld computing devices results in a tension between the displayed graphics and area provided for receiving inputs. For instance, the small display further constrains the display space, which may increase the difficulty of interpreting actions or results while a keypad or other user interface scheme is laid overtop or to the side of the applications in use such that the application is squeezed into an even smaller portion of the display. Thus a single display touch screen solution, which solves the problem of flexibility of the user interface may create an even more substantial set of problems of obfuscation of the display, visual clutter, and an overall conflict of action and attention between the user interface and the display.

Single display touch screen devices thus benefit from user interface flexibility, but are crippled by their limited screen space such that when users are entering information into the device through the display, the ability to interpret information in the display can be severely hampered. This problem is exacerbated in several key situations when complex interaction between display and interface is required, such as when manipulating layers on maps, playing a game, or modifying data received from a scientific application. This conflict between user interface and screen space severely limits the degree to which the touch based user interface may be used in an intuitive manner.

SUMMARY

A first aspect includes a method for controlling a handheld computing device including one or more displays. The method includes displaying an application in a first display condition. The first display condition includes an icon in a first state corresponding to the first display condition. The method further includes receiving a gesture input at a gesture sensor. For instance, the gesture sensor may be a touch sensitive device, optical device (e.g., a camera), or other sensor operable to detect user inputs in the form of a gesture. The method also includes modifying the manner in which the application is displayed in response to the receiving step. The modifying step includes changing the application to a second display condition such that the icon is in a second state corresponding to a second display condition.

A second aspect includes a handheld computing device comprising a processor. The device also includes a first display operable to display a first screen. The first display is in operative communication with the processor. The device also includes a second display that is operable to display a second screen. The second display is also in operative communication with the processor. The device also includes at least one gesture sensor operable to receive a gesture input. The processor is operable to execute an application that is displayable on at least one of the first display and the second display in response to the gesture input. The application includes an icon indicative of a display status of the application with respect to the first and second displays.

A number of feature refinements and additional features are applicable to the first and second aspects. These feature refinements and additional features may be used individually or in any combination. As such, each of the following features that will be discussed may be, but are not required to be, used with any other feature or combination of features of any of the aspects presented herein.

In one embodiment, the icon may be changed in proportion to the relative position of the application with respect to the first and second display. The first display condition may include displaying the application in only a first display. In this regard, the modifying may include expanding the application to occupy at least a first and second display. Additionally or alternatively, the first display condition may include displaying the application in at least a first and second display. In this regard, the modifying may include minimizing the application to occupy only one of the first and second displays.

The first and second dimension may define a first aspect ratio, and the third and fourth dimension may define a second aspect ratio. In one embodiment, the first aspect ratio may be different than the second aspect ratio. In this regard, the first dimension and the third dimension may be equal. In one embodiment, the first dimension and the third dimension may be vertical dimensions. In turn, the second dimension may correspond to a width of the application when displayed in the first display, and the fourth dimension may correspond with the width of the application when displayed in the first and the second display.

In another embodiment, the modifying may include animating the change of the application. As such, the animating may include the change of the icon from the first aspect ratio to the second aspect ratio. The icon may be indicative of whether the application is expandable, whether the application is expanded, or whether the application is expanding.

In yet another embodiment, the handheld computing device may be a smart phone. The first display and second display may be positionable with respect to each other between an open and closed position. In this regard, when in the open position, the first display and the second display, may be concurrently visible from the vantage point of a user. In contrast, when in the closed position, only one of the first display and the second display may be visible from the vantage point of a user.

BRIEF DESCRIPTION OF THE DRAWINGS

FIGS. 5A-5C are graphical representations of an embodiment of a handheld computing device during a progression wherein a screen is expanded into a second display.

DETAILED DESCRIPTION

The present disclosure is generally related to gesture inputs for interaction with a computing device. The interface controls are particularly suited for control of devices that have one or more displays capable of displaying graphical user interfaces (GUIs) on a handheld portable device. The following disclosure may, in various embodiments, be applied to other computing devices capable of displaying and responding to a GUI (e.g., laptop computers, tablet computers, desktop computers, touch screen monitors, etc.) and is not intended to be limited to handheld computing devices unless otherwise explicitly specified.

Figure 1:
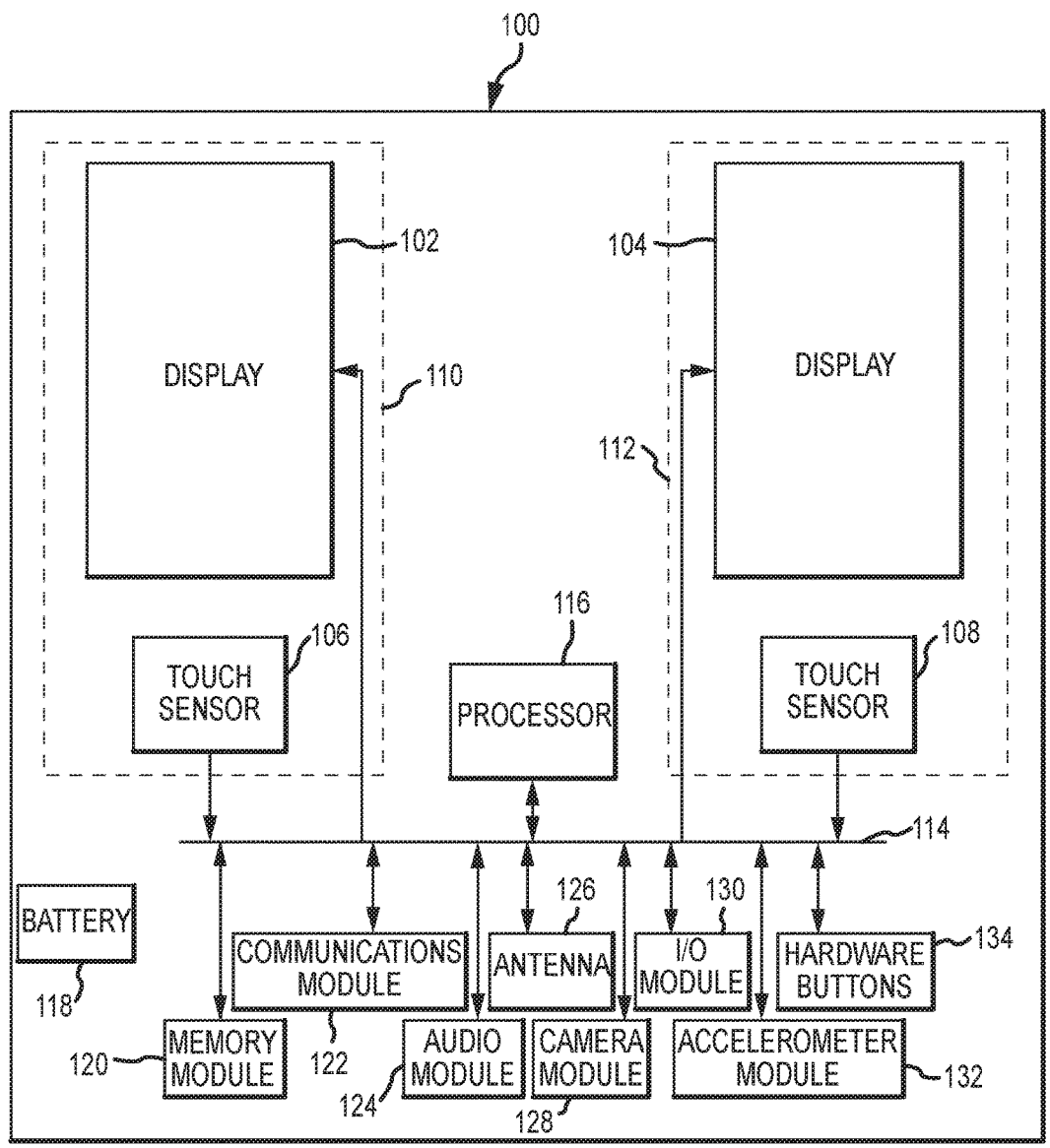
FIG. 1 is a schematic view of an embodiment of a handheld computing device.

FIG. 1 depicts an embodiment of a handheld computing device 100. The handheld computing device 100 may include a first display 102 and a second display 104. Additionally, while two displays (102, 104) may be shown and described below with regard to the functionality of various embodiments of handheld computing devices, a handheld computing device may be provided that includes one or more displays. In any regard, the first display 102 and the second display 104 may be independently controllable. The displays may be operative to display a displayed image or "screen". As used herein, the term "display" is intended to connote device hardware, whereas "screen" is intended to connote the displayed image produced on the display. In this regard, a display is a physical hardware that is operable to render a screen. A screen may encompass a majority of the display. For instance, a screen may occupy substantially all of the display area except for areas dedicated to other functions (e.g., menu bars, status bars, etc.) A screen may be associated with an application and/or an operating system executing on the handheld computing device 100. For instance, application screens or desktop screens may be displayed. An application may have various kinds of screens that are capable of being manipulated as will be described further below. In an embodiment, each display may have a resolution of 480 pixels by 800 pixels, although higher and lower resolution displays may also be provided.

A screen may be associated with an operating system, an application, or the like. In some instances, a screen may include interactive features (e.g., buttons, text fields, toggle fields, etc.) capable of manipulation by way of a user input. The user input may be received by various input devices (e.g., a physical keyboard, a roller ball, directional keys, a touch sensitive device, etc.). In some instances, a screen may simply include graphics and have no ability to receive an input by a user. In other instances, graphics features and input features may both be provided by a screen. As such, the one or more displays of a handheld computing device, the screens displayed on the one or more displays, and various user input devices may comprise a GUI that allows a user to exploit functionality of the handheld computing device.

The handheld computing device 100 may be configurable between a first position and a second position. In the first position, a single display (e.g., the first display 102 or the second display 104) may be visible from the perspective of a user. Both displays 102, 104 may be exposed on an exterior of the handheld device 100 when in the first position, but the displays 102, 104 may be arranged in a non-adjacent manner such that both displays 102, 104 are not concurrently visible from the perspective of a user (e.g., one display may be visible from the front of the device 100 and the other display may be visible from the back of the device 100).

The handheld computing device 100 may also be provided in the second position such that the displays 102, 104 may be concurrently viewable from the perspective of a user (e.g., the displays 102, 104 may be positioned adjacent to one another). The displays 102, 104 may be displayed in the second position such that the displays 102, 104 are arranged end-to-end or side-by-side. Additionally, the displays 102, 104 may be arranged in a portrait orientation or a landscape orientation with respect to a user. As will be discussed further below, a portrait orientation is intended to describe an arrangement of the handheld computing device, wherein the longer dimension of the display of the handheld computing device is vertically oriented (e.g., with respect to gravity or the perspective of a user). A landscape orientation is intended to describe an arrangement wherein the shorter dimension of the display of the handheld computing device is vertically oriented (e.g., with respect to gravity or the perspective of a user). Furthermore, the longer dimension and shorter dimension may refer to each display individually or the combined viewing area of the one or more displays of the device. Thus, when the individual displays are arranged in a portrait orientation, the overall display area may be arranged in a landscape orientation, and vice versa. Additionally, the displays and screens may be in different respective orientations. For instance, when the displays are in a landscape orientation, one or more screens may be rendered in a portrait orientation on the displays or vice versa.

The handheld computing device 100 may be manipulated between the first position (i.e., a single display visible from a user's perspective) and the second position (i.e., at least two displays concurrently visible from the user's perspective) in a variety of manners. For instance, the device 100 may include a slider mechanism such that the first and second displays 102, 104 are disposable adjacent to one another in a parallel fashion in a second position and slideable to the first position where only a single display is viewable and the other display is obscured by the viewable display.

Alternatively, the device 100 may be arranged in a clam shell type arrangement wherein a hinge is provided between the first display 102 and the second display 104 such that the displays 102, 104 are concurrently visible by a user when in the second position (i.e., an open position). The displays 102, 104 may be provided on an interior clam shell portion or an exterior clam shell portion of the device 100. In this regard, both displays 102, 104 may be visible from the front and the back of the device, respectively, when the device is in the first position (i.e., the closed position). When the device 100 is in the open position, the displays 102, 104 may be provided adjacent and parallel to one another. Alternative arrangements of the handheld computing device 100 are contemplated wherein different arrangements and/or relative locations of the displays may be provided when in the first and second position.

In addition, the first display 102 and the second display 104 may be provided as entirely separate devices. In this regard, a user may manipulate the displays 102, 104 such that they may be positioned adjacent to one another (e.g., side-by-side or end-to-end). The displays 102, 104 may be in operative communication when adjacently positioned such that the displays 102, 104 may operate in the manner provided in greater detail below when adjacently positioned (e.g., via physical contacts, wireless communications, etc.). A retention member (not shown) may be provided to retain the separate displays 102, 104 in an adjacent position. For instance, the retention member may include coordinating magnets, mechanical clips or fasteners, elastic members, etc.

While the foregoing has referenced two displays 102 and 104, alternate embodiments of a handheld device may include more than two displays. In this regard, the two or more displays may behave in a manner in accordance with the foregoing wherein only a single display is viewable by a user in a first position and multiple displays (i.e., more than two displays) are viewable in a second position. Additionally, in one embodiment, the two displays 102 and 104 may comprise separate portions of a unitary display. As such, the first display 102 may be a first portion of the unitary display and the second display 104 may be a second portion of the unitary display. For instance, the handheld computing device 100 (e.g., having a first and second display 102 and 104) may be operatively connected to the unitary display (e.g., via a connector or a dock portion of the unitary display) such that the first display 102 and the second display 104 of the handheld computing device 100 are emulated on the unitary display. As such, the unitary display may have first and second portions corresponding to and acting in a similar manner to the first and second display 102 and 104 of the handheld computing device 100 described below.

The handheld computing device 100 may further include one or more input devices that may be used to receive user inputs. These input devices may be operative to receive gesture inputs from a user, and, accordingly, may be referred to generally as gesture sensors. A number of different types of gesture sensors may be provided. Some examples include, but are not limited to traditional input devices (keypads, trackballs, etc.), touch sensitive devices, optical sensors (e.g., a camera or the like), etc. The discussion contained herein may reference the use of touch sensitive devices to receive gesture inputs. However, the use of touch sensitive devices is not intended to limit the means for receiving gesture inputs to touch sensitive devices alone and is provided for illustrative purposes only. Accordingly, any of the foregoing means for receiving a gesture input may be used to produce the functionality disclosed below with regard to gesture inputs received at touch sensitive devices.

In this regard, the handheld computing device 100 may include at least a first touch sensor 106. Furthermore, the handheld computing device may include a second touch sensor 108. The first touch sensor 106 and/or the second touch sensor 108 may be touchpad devices, touch screen devices, or other appropriate touch sensitive devices. Examples include capacitive touch sensitive panels, resistive touch sensitive panels, or devices employing other touch sensitive technologies. The first touch sensor 106 and/or second touch sensor 108 may be used in conjunction with a portion of a user's body (e.g., finger, thumb, hand, etc.), a stylus, or other acceptable touch sensitive interface mechanisms known in the art. Furthermore, the first touch sensor 106 and/or the second touch sensor 108 may be multi-touch devices capable of sensing multiple touches simultaneously.

The first touch sensor 106 may correspond to the first display 102 and the second touch sensor 108 may correspond to the second display 104. In one embodiment of the handheld computing device 100, the first display 102 and the first touch sensor 106 comprise a first touch screen display 110. In this regard, the first touch sensor 106 may be transparent or translucent and positioned with respect to the first display 102 such that a corresponding touch received at the first touch sensor 106 may be correlated to the first display 102 (e.g., to interact with a screen rendered on the first display 102). Similarly, the second display 104 and the second touch sensor 108 may comprise a second touch screen display 112. In this regard, the second touch sensor 108 may be positioned with respect to the second display 104 such that a touch received at the second touch sensor 108 may be correlated to the second display 104 (e.g., to interact with a screen rendered on the second display 104). Alternatively, the first touch sensor 106 and/or the second touch sensor 108 may be provided separately from the displays 102, 104. Furthermore, in an alternate embodiment, only a single gesture sensor may be provided that allows for inputs to control both the first display 102 and the second display 104. The single gesture sensor may also be provided separately or integrally with the displays.

In this regard, the first and second touch sensors 106, 108 may have the substantially same footprint on the handheld computing device 100 as the displays 102, 104. Alternatively, the touch sensors 106, 108 may have a footprint including less of the entirety of the displays 102, 104. Further still, the touch sensors 106, 108 may include a footprint that extends beyond the displays 102, 104 such that at least a portion of the touch sensors 106, 108 are provided in non-overlapping relation with respect to the displays 102, 104. As discussed further below, the touch sensors 106, 108 may alternatively be provided in complete non-overlapping relation such that the footprint of the touch sensors 106, 108 is completely different than the footprint of the displays 102, 104.

Figure 6A:
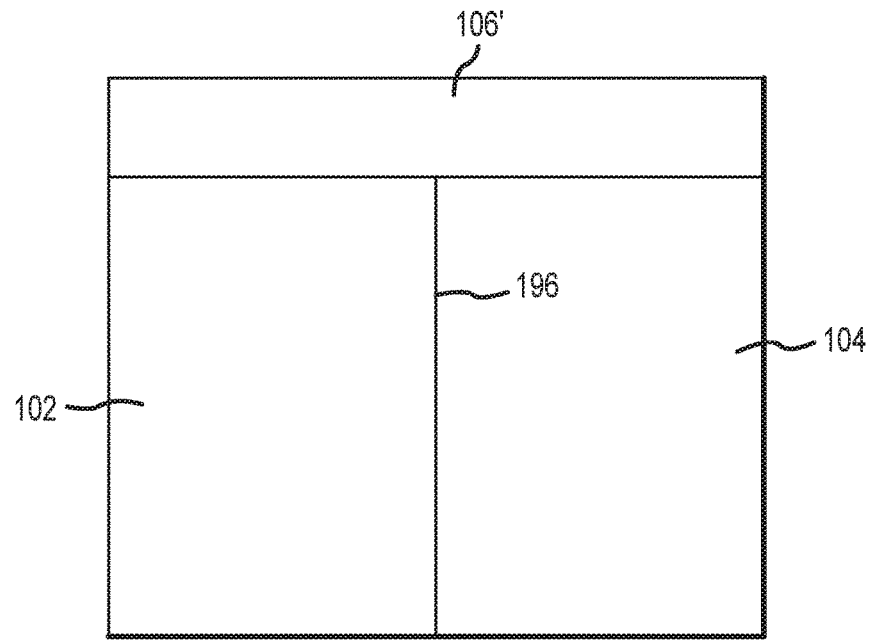
FIGS. 6A-6B are schematic views of embodiments of a handheld computing device provided with touch sensitive devices.
Figure 6B:
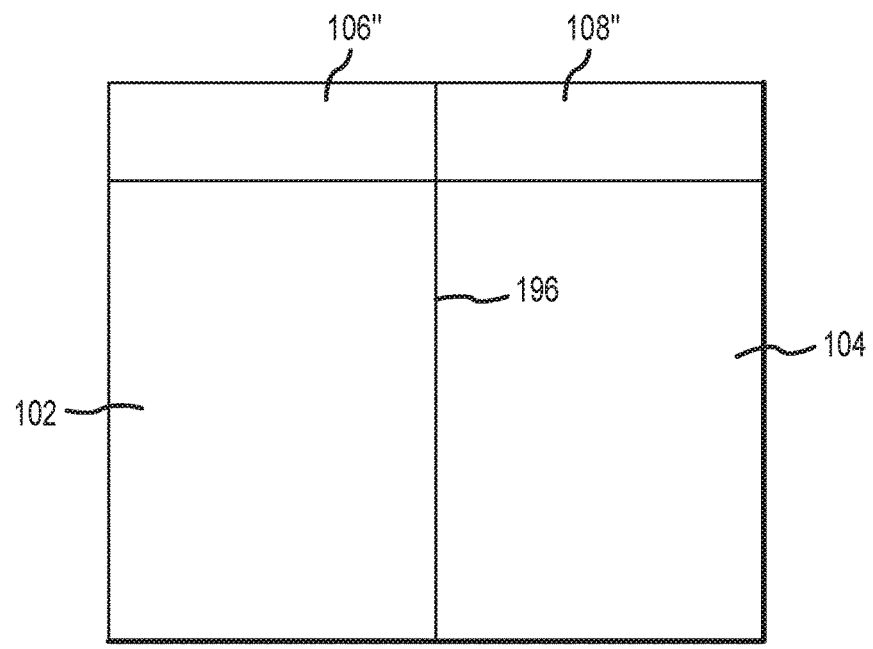

With reference to FIGS. 6A-B, various potential arrangements are depicted for the first display 102, the second display 104, and touch sensors 106', 106", and 108". In FIG. 6A, the first 102 and second display 104 are arranged side-by-side such that a crease 196 separates the displays. In this regard, the first display 102 and second display 104 may be arranged in a clam-shell type arrangement such that the crease 196 includes a hinge that allows for pivotal movement between the first display 102 and second display 104 as discussed above. A touch sensor 106' may span the width of both the first display 102 and the second display 104. In this regard, the touch sensor 106' may span the crease 196 without interruption. Alternatively, as shown in FIG. 6B, separate touch sensors 106" and 108" may be provided on either side of the crease 196. In this regard, each of the touch sensors 106" and 108" may span the width of each of the first display 102 and second display 104, respectively.

In any of the arrangements shown in FIGS. 6A-B, the displays (102, 104) may also comprise touch screen displays that may be used in conjunction with touch sensitive portions that are provided separately from the touch screen displays. Thus, displays 102 and 104 may both comprise touch screen displays and be provided in addition to touch sensitive devices 106', 106", and 108". Accordingly, a combination of touch screen displays (e.g., 110, 112) and off display touch sensors (e.g., 106', 106", 108") may be provided for a single device. Touch inputs may be received at both a touch screen display (110, 112) and off display touch sensor (106', 106", 108"). In this regard, gestures received at an off screen display sensor may have a different functionality than the same gesture received at a touch screen display. Also, a touch sensitive device may be divided into a plurality of zones. The same gesture received in different zones may have different functionality. For instance, a percentage (e.g., 10%, 25%, etc.) of the touch sensitive device at the top or bottom of the display may be defined as a separate zone than the remainder of the touch sensitive device. Thus, a gesture received in this zone may have a different functionality than a gesture received in the remainder of the touch sensitive device.

The handheld computing device 100 may further include a processor 116. The processor 116 may be in operative communication with a data bus 114. The processor 116 may generally be operative to control the functionality of the handheld device 100. For instance, the processor 116 may execute an operating system and be operative to execute applications. The processor 116 may be in communication with one or more additional components 120-134 of the handheld computing device 100 as will be described below.

For instance, the processor 116 may be in direct communication with one more of the additional components 120-134 or may communicate with the one or more additional components 120-134 via the data bus 114. Furthermore, while the discussion below may describe the additional components 120-134 being in operative communication with the data bus 114, in other embodiments any of the additional components 120-134 may be in direct operative communication with any of the other additional components 120-134. Furthermore, the processor 116 may be operative to independently control the first display 102 and the second display 104 and may be operative to receive input from the first touch sensor 106 and the second touch sensor 108. The processor 116 may comprise one or more different processors. For example, the processor 116 may comprise one or more application specific integrated circuits (ASICs), one or more field-programmable gate arrays (FPGAs), one or more general purpose processors operative to execute machine readable code, or a combination of the foregoing.

The handheld computing device may include a battery 118 operative to provide power to the various devices and components of the handheld computing device 100. In this regard, the handheld computing device 100 may be portable.

The handheld computing device 100 may further include a memory module 120 in operative communication with the data bus 114. The memory module 120 may be operative to store data (e.g., application data). For instance, the memory 120 may store machine readable code executable by the processor 116 to execute various functionalities of the device 100.

Additionally, a communications module 122 may be in operative communication with one or more components via the data bus 114. The communications module 122 may be operative to communicate over a cellular network, a Wi-Fi connection, a hardwired connection or other appropriate means of wired or wireless communication. The handheld computing device 100 may also include an antenna 126. The antenna 126 may be in operative communication with the communications module 122 to provide wireless capability to the communications module 122. Accordingly, the handheld computing device 100 may have telephony capability (i.e., the handheld computing device 100 may be a smartphone device).

An audio module 124 may also be provided in operative communication with the data bus 114. The audio module 124 may include a microphone and/or speakers. In this regard, the audio module 124 may be able to capture audio or produce sounds. Furthermore, the device 100 may include a camera module 128. The camera module 128 may be in operative communication with other components of the handheld computing device 100 to facilitate the capture and storage of images or video.

Additionally, the handheld computing device 100 may include an I/O module 130. The I/O module 130 may provide input and output features for the handheld computing device 100 such that the handheld computing device 100 may be connected via a connector or other device in order to provide syncing or other communications between the handheld computing device 100 and another device (e.g., a peripheral device, another computing device etc.).

The handheld computing device 100 may further include an accelerometer module 132. The accelerometer module 132 may be able to monitor the orientation of the handheld computing device 100 with respect to gravity. In this regard, the accelerometer module 132 may be operable to determine whether the handheld computing device 100 is substantially in a portrait orientation or landscape orientation. The accelerometer module 132 may further provide other control functionality by monitoring the orientation and/or movement of the handheld computing device 100.

The handheld computing device 100 may also include one or more hardware buttons 134. The hardware buttons 134 may be used to control various features of the handheld computing device 100. The hardware buttons 134 may have fixed functionality or may be contextual such that the specific function of the buttons changes during operation of the handheld computing device 100. Examples of such hardware buttons may include, but are not limited to, a volume control, a home screen button, an end button, a send button, a menu button, etc.

With further reference to FIGS. 2A-D, various screens of an embodiment of a device are shown. multiple screens may be shown, only one or a subset of the multiple screens may be shown on the displays of the device at any one moment. In this regard, a screen may be described in a relative location to the displays or other screens (e.g., to the left of a display, to the right of a display, under another screen, above another screen, etc.). These relationships may be logically established such that no physical display reflects the relative position. For instance, a screen may be moved off a display to the left. While the screen is no longer displayed on the display, the screen may have a virtual or logical position to the left of the display from which it was moved. This logical position may be recognized by a user and embodied in values describing the screen (e.g., values stored in memory correspond to the screen). Thus, when referencing screens in relative locations to other screens, the relationships may be embodied in logic and not physically reflected in the display of the device.

FIGS. 2A-D may display a number of different screens that may be displayed at various instances of operation of a handheld device and are not intended to be presented in any particular order or arrangement. Single screen applications and multi screen applications may be provided. A single screen application is intended to describe an application that is capable of producing a screen that may occupy only a single display at a time. A multi screen application is intended to describe an application that is capable of producing one or more screens that may simultaneously occupy multiple displays. Additionally, a multi screen application may occupy a single display. In this regard, a multi screen application may have a single screen mode and a multi screen mode.

Figure 2A:
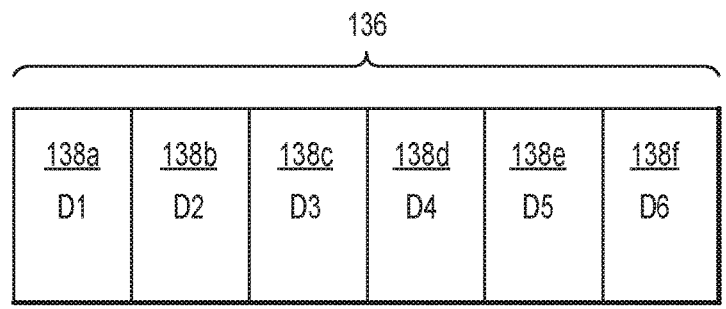
FIGS. 2A-D are graphical representations of an embodiment of a handheld computing device in various instances of operation.

A desktop sequence 136 is displayed in FIG. 2A. The desktop sequence 136 may include a number of individual desktop screens 138a-138f. Thus, each desktop screen 138 may occupy substantially the entirety of a single display (e.g., the first display 102 or second display 104 of FIG. 1). The desktop screens 138a-138f may be in a predetermined order such that the desktop screens 138a-138f appear consecutively and the order in which the desktop screens appear may not be reordered. However, the desktop screens 138a-138f may be sequentially navigated (e.g., in response to a user input). That is, one or more of the desktop screens 138a-138f may be sequentially displayed on a handheld device as controlled by a user input.

Figure 2B:
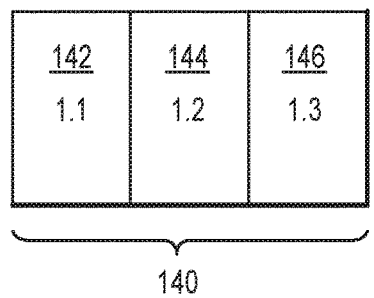
Figure 2C:
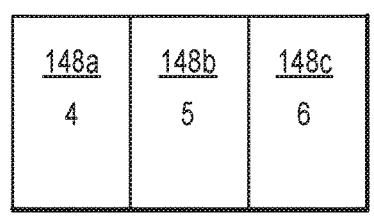

Additionally, FIG. 2B displays a hierarchal application sequence 140 of a multi screen application. The hierarchal application sequence 140 may include a root screen 142, one or more node screens 144, and a leaf screen 146. The root screen 142 may be a top level view of the hierarchical application sequence 140 such that there is no parent screen corresponding to the root screen 142. The root screen 142 may be a parent to a node screen 144. One or more node screens 144 may be provided that are related as parent/children. A node screen may also serve as a parent to a leaf screen 146. By leaf screen 146, it is meant that the leaf screen 146 has no corresponding node screen 144 for which the leaf screen 146 is a parent. As such, the leaf screen does not have any children node screens 144. FIG. 2C depicts various single screen applications 148a, 148b, and 148c arranged sequentially. Each of these single screen applications may correspond to a different executing application. For instance, in FIG. 2C Application 4, Application 5, and Application 6 may be executing on the device and correspond to each single screen 148a, 148b, and 148c, respectively.

Figure 2D:
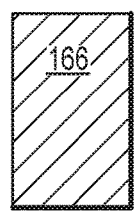

FIG. 2D also includes an empty view 166. The empty view 166 may be used during transitions of a screen (e.g., movement of screen between a first display and a second display). It is not necessary that the empty view 166 be interpretable by the user as an effective GUI screen. The empty view 166 merely communicates to the user that an action regarding the screen (e.g., the movement of the screen with respect to one or more displays) is occurring. An application displaying an empty view 166 need not be able to rest, wait, process or interpret input. The empty view 166 may display a screen, or a representation thereof, as it is being moved in proportion to the amount of the screen that has been moved from a first display to a second display as will be discussed in greater detail below. In this regard, the empty view 166 may be used to relate information regarding the position of a screen during a transition of the screen (e.g., in response to gesture). An empty view 166 is only intended to refer to a screen not capable of receiving an input (e.g., a screen in transition). In this regard, the display of an empty view 166 may include an animation or the like showing the response of a screen as it is being moved or changed (e.g., modified into or out of a landscape mode).

Figure 3A:
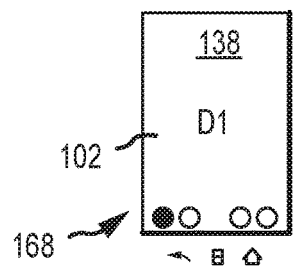
FIGS. 3A-K are graphical representations of an embodiment of a handheld computing device provided in different positions, orientations, and instances of operation.
Figure 3B:
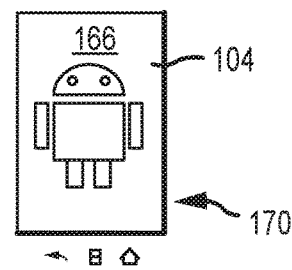
Figure 3C:
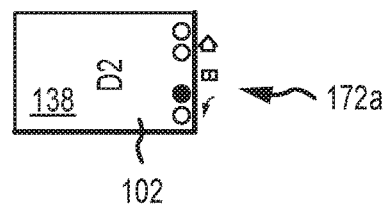
Figure 3D:
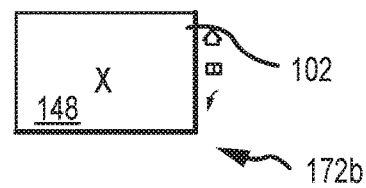
Figure 3E:
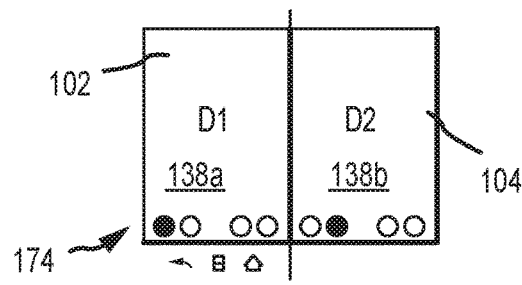
Figure 3F:
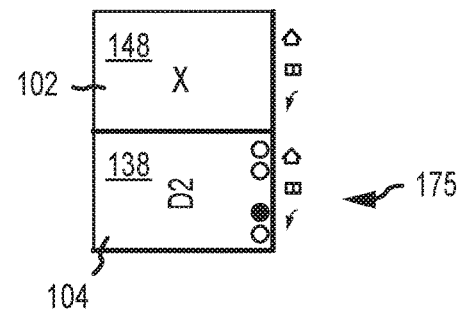
Figure 3G:
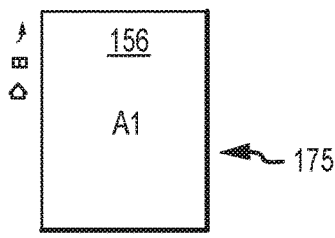
Figure 3H:
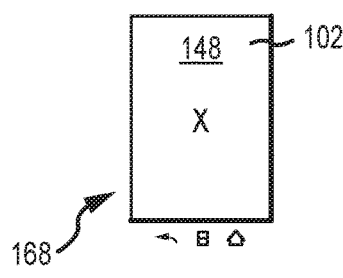

FIGS. 3A-K depict various arrangements and statuses of displays 102, 104 of a device that are possible in various embodiments of a handheld computing device according to the present disclosure. For instance, when in the first (e.g., closed) position, a closed front display 168 may be visible as shown in FIG. 3A. The closed front display 168 may correspond with the first display 102 or the second display 104. The closed front 168 as displayed may be occupied by a desktop screen D1 138 as shown in FIG. 3A. Alternatively, an application with a single screen or a multi screen application in single screen mode may be displayed in the closed front 168. A closed back display 170 may be viewable from an opposite side of the display when the device is in a closed position, as shown in FIG. 3B. The closed back 170 may display a different desktop screen or application screen than the closed front 168 (e.g., as shown in FIG. 3H) or may simply display an empty view 166 (e.g., displaying an icon or other graphic) and lack functionality as an interface.

FIG. 3C depicts a closed device in a landscape orientation 172a. In one embodiment, a landscape mode (i.e., wherein the display is adjusted to display a screen in a landscape orientation) may not be enabled as shown in FIG. 3C. Alternatively, the landscape mode may be enabled such that the screen (e.g., application screen 148) is modified when the device is sensed in a landscape orientation 172b, such that the screen 148 is rendered in a landscape orientation as shown at FIG. 3D. The device may further be provided in a second (e.g., open) position 174 as shown in FIG. 3E.

In the open position 174, at least two displays 102, 104 are arranged such that the two displays 102, 104 are both visible from the vantage point of a user. The two displays 102, 104 may be arranged in a side-by-side fashion when in the open position 174. Thus, each of the two displays 102, 104 may display separate screens. For instance, the displays 102, 104 may each display a separate desktop screen 138*a*, 138*b*, respectively. While the individual displays 102 and 104 are in a portrait orientation as shown in FIG. 3E, it may be appreciated that the full display area (comprising both the first display 102 and the second display 104) may be arranged in a landscape orientation. Thus, whether the device as depicted in FIG. 3E is in a landscape or portrait orientation may depend on whether the displays are being used individually or collectively. If used collectively as a unitary display, the device may be in a landscape orientation, whereas if the displays are used separately, the orientation shown in FIG. 3E may be referred to as a portrait orientation.

Additionally, when the device is in an open position 174 as shown in FIG. 3F, a similar dependency with regard to the use of the screens as a unitary display or separate displays may also affect whether the device is in a portrait orientation or landscape orientation. As can be appreciated, each individual screen is in a landscape orientation, such that if the displays are used separately, the device may be in a landscape orientation. If used as a unitary display, the device may be in a portrait orientation. In any regard, as shown in FIG. 3F, a single screen 148 may occupy a first display 102 and the second display 104 may display a desktop screen 138. The single screen 148 may be displayed in a landscape or portrait mode. Alternatively, a device in an open orientation may display a multi screen application 156 that may occupy both displays 102, 104 in a portrait orientation as shown in FIG. 3G such that the individual displays are in a landscape orientation.

Figure 3I:
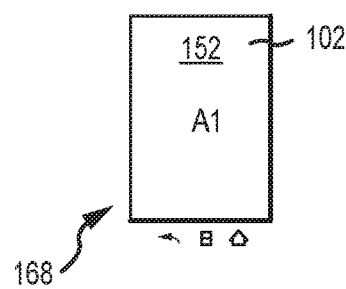
Figure 3J:
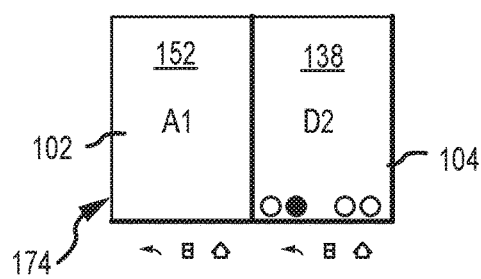
Figure 3K:
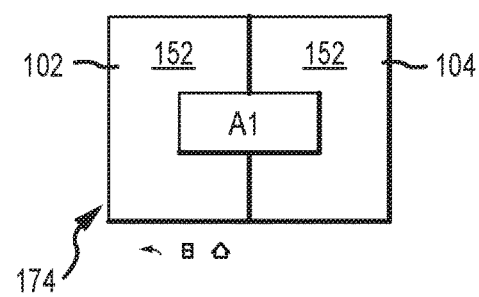

FIGS. 3I-K depict the potential arrangements of the screens of a multi screen application 152. The multi screen application 152 may, in one mode, occupy a single display 102 when the device is in a closed position 168 as shown in FIG. 3I. That is, the multi screen application 152 may be in a single screen mode. Alternatively, when the device is in an open position as shown in FIG. 3J, the multi screen application 152 may still occupy a single display 102 in single screen mode. Furthermore, the multi screen application 152 may be expanded to occupy both displays 102, 104 when the device is in the open position as shown in FIG. 3K. In this regard, the multi screen application 152 may also execute in a multi screen mode. Various options may be provided for expanding the multi screen application 152 from a single screen mode to a multi screen mode.

For example, the multi screen application 152 may be maximized from a single screen mode displayed in a single display to two screens displayed in two displays such that a parent screen is displayed in the first display and a node screen (e.g., a child screen) is expanded into the second display. In this regard, each of the screens displayed in the first and second display may be independent screens that comprise part of a hierarchical application sequence (e.g., as shown in FIG. 2B). Alternatively, the single screen mode of the multi screen application may simply be scaled such that the contents of the single screen are scaled to occupy both displays. Thus, the same content displayed in the single screen is scaled to occupy multiple displays, but no additional viewing area or graphics are presented. Further still, the maximization of the multi screen application from a single screen mode to a multi screen mode may result in the expansion of the viewable area of the application. For example, if a multi screen application is displayed in single screen mode, upon maximization into multi screen mode, the viewable area of the multi-screen application may be expanded while the scale of the graphics displayed remains the same. In this regard, the viewable area of the multi-screen application may be expanded into the second display while the scaling remains constant upon expansion.

In this regard, an application may have configurable functionality regarding the nature and behavior of the screens of the application. For instance, an application may be configurable to be a single screen application or a multi screen application. Furthermore, a multi screen application may be configurable as to the nature of the expansion of the multi screen application between a single screen mode and a multi screen mode. These configuration values may be default values that may be changed or may be permanent values for various applications. These configuration values may be communicated to the device (e.g., the processor 116) to dictate the behavior of the application when executing on the device.

Figure 4:
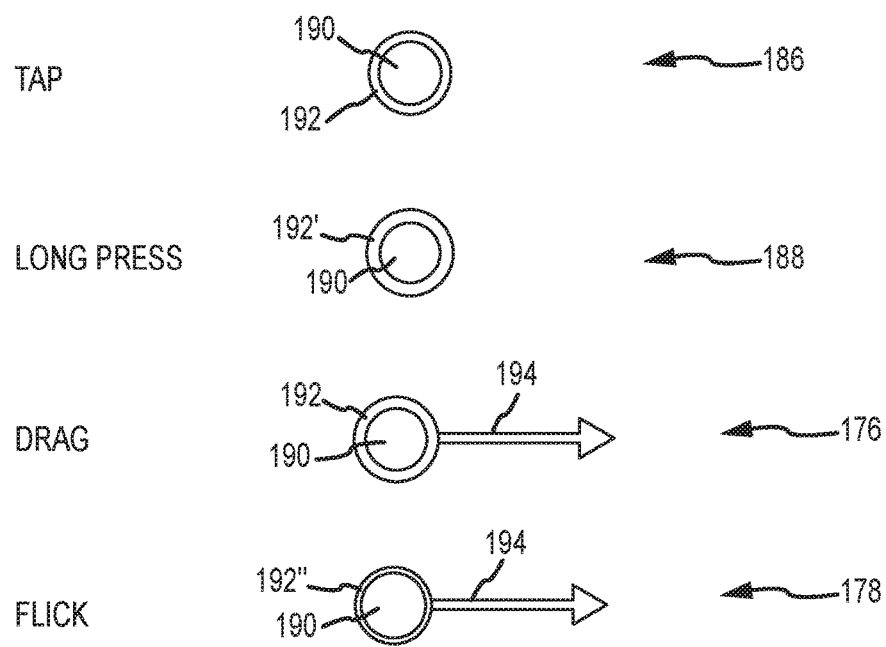
FIG. 4 includes graphical representations of various gesture inputs for controlling a handheld computing device.

FIG. 4 depicts various graphical representations of gesture inputs that may be recognized by a handheld computing device. The gestures shown are demonstrative, and as such, other gestures may be provided without limitation. Such gestures may be received at one or more gesture sensors of the device. In this regard, various input mechanisms may be used in order to generate the gestures shown in FIG. 4. For example a stylus, a user's finger(s), or other devices may be used to activate a touch sensitive device in order to receive the gestures. Alternatively, the gestures may be detected by an optical device (e.g., a camera). The use of a gesture may describe the use of a truncated input that results in functionality without the full range of motion necessary to conventionally carry out the same functionality. For instance, movement of screens between displays may be carried out by selecting and moving the screen between displays such that the full extent of the motion between displays is received as an input. However, such an implementation may be difficult to accomplish in that the first and second displays may comprise separate display portions without continuity therebetween. As such, a gesture may truncate the full motion of movement or provide an alternative input to accomplish the same functionality. Thus, movement spanning the first and second display may be truncated so that the gesture may be received at a single touch sensitive device. The use of gesture inputs is particularly suited to handheld computing devices in that the full action of an input may be difficult to execute given the limited input and display space commonly provided on a handheld computing device.

With reference to FIG. 4, a circle 190 may represent a touch received at a touch sensitive device. The circle 190 may include a border 192, the thickness of which may indicate the length of time the touch is held stationary at the touch sensitive device. In this regard, a tap 186 has a thinner border 192 than the border 192' for a long press 188. In this regard, the long press 188 may involve a touch that remains stationary on the touch sensitive display for longer than that of a tap 186. As such, different gestures may be registered depending upon the length of time that the touch remains stationary prior to movement.

A drag 176 involves a touch (represented by circle 190) with movement 194 in a direction. The drag 176 may involve an initiating touch that remains stationary on the touch sensitive device for a certain amount of time represented by the border 192. In contrast, a flick 178 may involve a touch with a shorter dwell time prior to movement than the drag as indicated by the thinner border 192" of the flick 178. Thus, again different gestures may be produced by differing dwell times of a touch prior to movement. The flick 178 may also include movement 194. The direction of movement 194 of the drag and flick 178 may be referred to as the direction of the drag or direction of the flick. Thus, a drag to the right may describe a drag 176 with movement 194 to the right.

In an embodiment, a gesture having movement (e.g., a flick or drag gesture as described above) may be limited to movement in a single direction along a first axis. Thus, while movement in a direction different than along the first axis may be disregarded so long as contact with the touch sensitive device is unbroken. In this regard, once a gesture is initiated, movement in a direction not along an axis along which initial movement is registered may be disregarded or only the vector component of movement along the axis may be registered.

Figure 7:
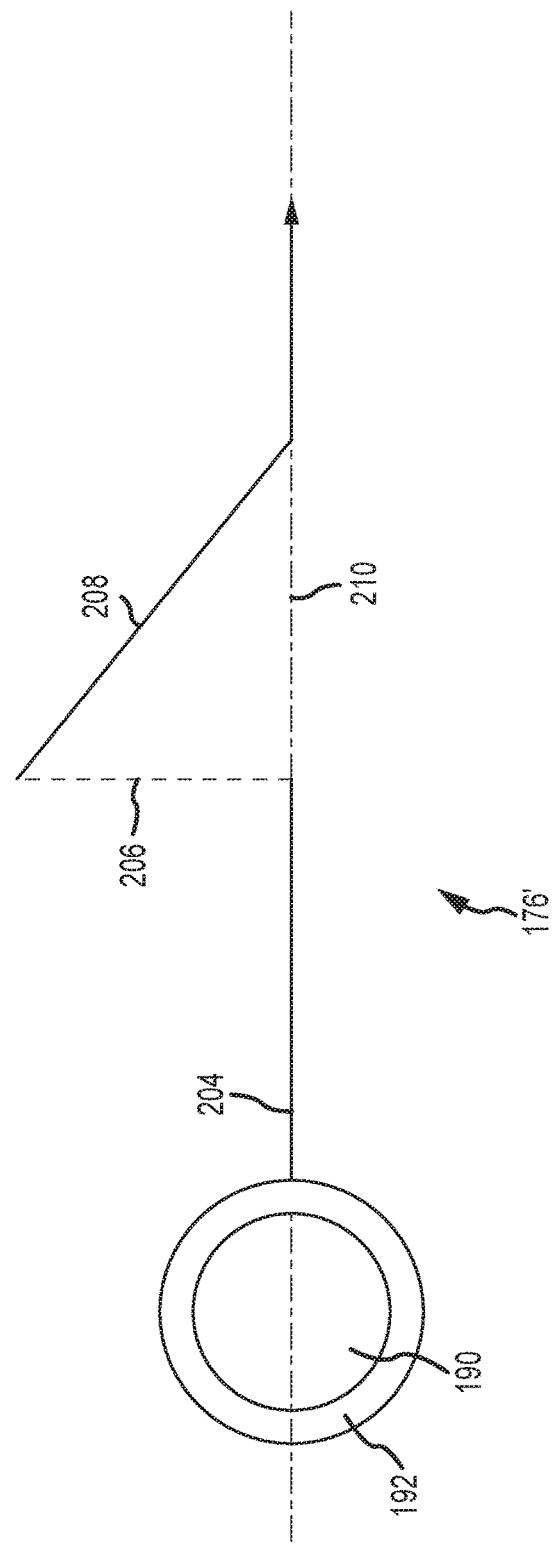
FIG. 7 is a graphical representation of an embodiment of a gesture input.

While the directional gestures (e.g., the drag 176 and flick 178) shown in FIG. 4 include only horizontal motion after the initiation of the gesture, this may not be actual movement of the touch during the gesture. For instance, once the drag 176 is initiated in the horizontal direction, movement in a direction other than in the horizontal direction may not result in movement of the screen to be moved in the direction different and the horizontal direction. For instance, with further reference to FIG. 7, the drag 176 from left to right may be initiated with initial movement 204 from left to right along an initiated direction 210. Subsequently, while the user may input an off direction movement 206 in a direction different than the initiated direction 210. In this regard, the off direction movement 206 may not result in any movement of a screen between two displays. Furthermore, the user may input partially off direction movement 208, where only a vector portion of the movement is in the direction of the initiated direction 210. In this regard, only the portion of the partially off direction movement 208 may result in movement of a screen between displays. In short, the movement of application screens between the first display 102 and the second display 104 may be constrained along a single axis along which the displays are arranged.

The handheld computing device that is positionable such that a first display 102 and a second display 104 are both visible from the vantage point of the user may allow for expansion of applications to occupy both the first display 102 and the second display 104. This expansion may be by a variety of techniques such as, for example, by way of receipt of a gesture or otherwise. In that applications may include one or more screens or have screens that may be expanded across multiple displays, it may be advantageous to provide an indication to a user as to whether the application screen is expandable, has been expanded, or is in the process of expanding.

To this end, a screen may include an icon which indicates to a user the state of the screen (e.g., be it in an expanded mode, unexpanded mode, or expanding mode). The icon may be morphed along with the expansion of the application screen or application into another display. Such an arrangement is depicted in FIGS. 5A-5C. In FIG. 5A, an expandable multiscreen application 156 is disposed in a first display 102. A first screen 156A of the application 156 occupies substantially all of the first display 102. An icon 500, is provided on the first screen 156A and may indicate to a user that the application 156 may be expanded. The icon 500 may be located along a periphery of the first display 102. For instance, as shown, the icon 500 may be arranged along a top portion of the display. The icon 500 may be provided adjacent to or superimposed on a status bar 550. As shown, the icon 500 occupies a portion of the status bar 550 and the application screen 156A, however other embodiments may be provided wherein the icon 500 is disposed wholly within the status bar 550, the application screen 156A, or in some other fashion. The status bar 550 may provide data such as cellular signal strength, cellular carrier information, services executing on the device, battery strength, time/date information, or other appropriate information. In other embodiments, the icon 500 could be provided in other locations such as along the bottom of the first display 102 or away from a peripheral edge of the display 102.

The icon 500 may have a number of states that correspond with the condition of the application 156. As such, icon 500 may be in a first state. In turn, icon 500" may correspond to the icon 500 in a second state (e.g., wherein application 156 is in a second condition). Icon 500' may represent icon 500 in a state between the first state and second state.

A second display 104 including a desktop screen 138 is also visible to a user. Upon initiation of expansion of the application 156 into the second display 104, shown in FIG. 5B, the icon 500 may morph into icon 500' as the second screen 156B of application 156 begins to expand into the second display 104. The expansion of application 156 into the second display may be animated such that the second screen 156B of application 156 appears as though it is moving from the first display 102 to the second display 104. With this animation, the icon 500 may morph to icon 500' and finally to icon 500" as shown in FIG. 5C once the application 156 has expanded to occupy the first display 102 and the second display 104. The icon 500" may extend across both displays. This may additionally indicate to a user that the application 156 may be minimized to occupy only the single display.

In this regard, the icon 500 may include a first dimension and a second dimension comprising a first aspect ratio. Icon 500" may have a third dimension and a fourth dimension comprising a second aspect ratio. In various embodiments, the first aspect ratio and second aspect ratio may change or may remain constant upon expansion of the application 156. For example, the first aspect ratio may change as the application 156 expands to occupy both displays until finally the icon 500" is in a steady state, wherein the icon 500" defines the second aspect ratio. In this regard, the first dimension and the third dimension of the icon 500 and 500", respectively, may be the same. That is, icon 500 and 500" may share a common dimension in a first direction. For instance, at the first dimension and the third dimension may comprise a height dimension. In this regard, the height of icon 500 may not change as it morphs to 500", however, the width of icon 500 may expand commensurately with the expansion of the application into the second display. In other embodiments, the height of the icons 500, 500', and 500" may also change (e.g., to maintain a constant aspect ratio); however, such an instance is not shown.

When modifying the manner in which the application is displayed, the modifying may include a stretching or expanding of the icon 500 into the second display 104 in proportion to the expansion of the application 156. In this regard, the width (e.g., the first or third dimension) may be proportionate to the width of the application 156 as it expands into the second display. That is, the icon 500' may have a length corresponding to the width of screen 156A and any portion of the width of screen 156B as it is expanded into the second display 104. As such, once fully expanded, icon 550" may have a width equal to the width of screens 156A and 156B combined (e.g., as a continuous icon spanning both screens).

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method comprising:
providing a handheld device with a first display and a second display, wherein the device is in an open state where both the first display and second display are viewable by a user;
displaying a first screen of an application in the first display;
displaying an icon associated with the application in the first display;
receiving an input to change a display of the application;
in response to the input, modifying the first screen to display over the first and second displays; and
in response to modifying the first screen, indicating modification of the first screen by changing a size of the icon displayed in the first screen.

2. The method according to claim 1, wherein the icon is changed in proportion to the first screen.

3. The method according to claim 2, wherein the change in the icon is proportional to a change in at least one aspect ratio.

4. The method according to claim 3, wherein a first dimension and second dimension define a first aspect ratio when the first screen is displayed only in the first display.

5. The method according to claim 4, wherein the first dimension and the second dimension are vertical dimensions.

6. The method according to claim 5, wherein the first dimension corresponds to a first height of the first screen when the first screen is displayed only in the first display.

7. The method according to claim 6, wherein the second dimension corresponds to a first height of the icon when the first screen is displayed only in the first display.

8. The method according to claim 7, wherein a third dimension and fourth define a second aspect ratio when the first screen is displayed across both the first and second displays.

9. The method according to claim 8, wherein the third dimension and the fourth dimension are vertical dimensions.

10. The method according to claim 9, wherein the third dimension corresponds to a second height of the first screen when the first screen is displayed across both the first and second displays.

11. The method according to claim 10, wherein the fourth dimension corresponds to a second height of the icon when the first screen is displayed across both the first and second displays.

12. The method according to claim 11, wherein the first aspect ratio and the second aspect ratio are substantially same.

13. The method according to claim 12, wherein the fourth dimension is determined by dividing the third dimension by the first aspect ratio.

14. The method according to claim 13, wherein the size of the icon is changed by changing the second dimension of the icon to the fourth dimension.

15. A handheld computing device, comprising:
a first display;
a second display;
a processor in communication with the first display and the second display, wherein the processor is operable to:
execute an application that is displayable, as a first screen, on both the first display and the second display;
display an icon associated with the application in the first screen, wherein the icon has a first dimension when the first screen is displayed on both the first and second displays;
receive an input to display the first screen in only the first display;
in response to the input, modify the first screen to display only on the first display; and
in response to modifying the first screen, indicating modification of the first screen by changing one of a size and a shape of the icon displayed in the first screen.

16. A device as recited in claim 15, wherein the icon is indicative of whether the application is expandable, whether the application is expanded, or whether the application is expanding.

17. The device as recited in claim 16, wherein the first display and second display are positionable with respect to each other between an open and closed position, wherein when in the open position, the first display and the second display are visible from the vantage point of a user, and wherein when in the closed position, only one of the first display and the second display are visible from the vantage point of a user.

18. The device according to claim 17, wherein the icon indicates one of three states, the three states including an expandable state, an expanded state, and an expanding state, and wherein the icon morphs to indicate that the application is in one of two or more states, the morphing comprising changing the shape and size of the icon.

19. A non-transitory computer readable medium comprising instructions executable by a computer system, the instructions comprising:
instructions to display a first screen of an application in the first display;
instructions to display an icon associated with the application in the first display;
instructions to receive an input to change a display of the application;
in response to the input, instructions to modify the first screen to display over the first and second displays;
in response to modifying the first screen, instructions to indicate modification of the first screen by changing a size of the icon displayed in the first screen.

20. The non-transitory computer readable medium according to claim 19, wherein the icon indicates one of three states, the three states including an expandable state, an expanded state, and an expanding state, and wherein the icon morphs to indicate that the application is in one of two or more states, the morphing comprising changing the shape and size of the icon.

* * * * *